(12) United States Patent
Watanabe et al.

(10) Patent No.: US 11,287,008 B2
(45) Date of Patent: Mar. 29, 2022

(54) DAMPER

(71) Applicant: OILES CORPORATION, Tokyo (JP)

(72) Inventors: Hiroshi Watanabe, Fujisawa (JP);
Ryohei Kaneko, Fujisawa (JP); Wataru Nishioka, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/769,629

(22) PCT Filed: Nov. 21, 2018

(86) PCT No.: PCT/JP2018/043017
§ 371 (c)(1),
(2) Date: Jun. 4, 2020

(87) PCT Pub. No.: WO2019/111714
PCT Pub. Date: Jun. 13, 2019

(65) Prior Publication Data
US 2020/0318706 A1 Oct. 8, 2020

(30) Foreign Application Priority Data

Dec. 8, 2017 (JP) .............................. JP2017-236004

(51) Int. Cl.
*F16F 9/14* (2006.01)
*F16F 9/32* (2006.01)

(52) U.S. Cl.
CPC .................. *F16F 9/14* (2013.01); *F16F 9/32* (2013.01); *B60G 2202/22* (2013.01)

(58) Field of Classification Search
CPC ...... F16F 9/14; F16F 9/32; F16F 9/145; F16F 9/362; B60G 2202/22
See application file for complete search history.

(56) References Cited

U.S. PATENT DOCUMENTS

| | | | |
|---|---|---|---|
| 2,420,039 A | * | 5/1947 | Frisby ...................... F16J 15/38 |
| | | | 277/500 |
| 4,541,638 A | | 9/1985 | Ogawa |

(Continued)

FOREIGN PATENT DOCUMENTS

| | | |
|---|---|---|
| CN | 107110270 A | 8/2017 |
| EP | 0 769 636 A2 | 4/1997 |

(Continued)

OTHER PUBLICATIONS

International Search Report for PCT/JP2018/043017, dated Jan. 22, 2019, 4 pages.

(Continued)

*Primary Examiner* — Thomas W Irvin
(74) *Attorney, Agent, or Firm* — Nixon & Vanderhye P.C.

(57) ABSTRACT

A rotary damper (1) has a first sealing ring (8a) and a first bushing (4a) which are located between a through-hole (23) of a circular cylindrical chamber (21) inside a case (2) and a lower end part (33a) of a rotor body (31) of a rotor (3), and a second sealing ring (8b) and a second bushing (4b) which are located between a through-hole (60) in a lid (6) and an upper end part (33b) of the rotor body (31). The first sealing ring (8a) has an outer peripheral surface (85) having a width in a direction of a center axis of the circular cylindrical chamber (21) and being pressed against an inner peripheral surface (220) of the through-hole (23), and an inner peripheral surface (84) having a width in the direction of the center axis of the circular cylindrical chamber (21) and being pressed against an outer peripheral surface (34) of the lower end part (33a), and the second sealing ring (8b) has an outer peripheral surface (85) having a width in the direction of the center axis of the circular cylindrical chamber (21) and being pressed against an inner peripheral surface (64) of the through-hole 961 (60), and an inner peripheral surface (84) having a width in the direction of the center axis of the (Continued)

(A)

(B)

circular cylindrical chamber (21) and being pressed against the outer peripheral surface (34) of the upper end part (33*b*).

17 Claims, 12 Drawing Sheets

(56) References Cited

U.S. PATENT DOCUMENTS

| | | | |
|---|---|---|---|
| 5,497,863 A | 3/1996 | Schmidt et al. | |
| 5,791,444 A * | 8/1998 | Schiffler | B60G 21/0555 188/293 |
| 5,901,821 A | 5/1999 | Hanawa | |
| 6,390,255 B2 * | 5/2002 | Kobori | F16F 9/145 188/290 |
| 6,725,984 B2 * | 4/2004 | Orita | E05F 5/10 188/290 |
| 6,840,355 B2 * | 1/2005 | Iwashita | A47K 13/10 188/290 |
| 7,111,712 B2 * | 9/2006 | Orita | F16F 9/145 188/290 |
| 9,321,491 B2 * | 4/2016 | Horita | E05F 5/022 |
| 10,400,846 B2 * | 9/2019 | Horita | F16F 9/14 |
| 10,900,536 B2 * | 1/2021 | Watanabe | F16F 9/145 |
| 2002/0007993 A1 * | 1/2002 | Kobori | F16F 9/145 188/290 |
| 2002/0179387 A1 * | 12/2002 | Orita | F16F 9/145 188/290 |
| 2003/0150678 A1 * | 8/2003 | Iwashita | F16F 9/145 188/296 |
| 2011/0139558 A1 * | 6/2011 | Cultraro | F16F 9/145 188/322.15 |
| 2012/0252590 A1 * | 10/2012 | Yonezawa | F16F 9/145 464/180 |
| 2014/0190779 A1 * | 7/2014 | Horita | B62D 33/027 188/282.1 |
| 2017/0321780 A1 * | 11/2017 | Horita | F16F 9/145 |
| 2019/0331190 A1 * | 10/2019 | Watanabe | F16F 9/18 |
| 2020/0096074 A1 * | 3/2020 | Orita | F16F 9/516 |

FOREIGN PATENT DOCUMENTS

| | | |
|---|---|---|
| EP | 2 503 180 A2 | 9/2012 |
| FR | 2 738 531 A1 | 3/1997 |
| JP | S59-196738 | 12/1984 |
| JP | 2-84030 | 6/1990 |
| JP | 2-94947 | 7/1990 |
| JP | H07-83263 | 3/1995 |
| JP | H07-301272 | 11/1995 |
| JP | 9-210110 A | 8/1997 |
| JP | 10-122287 A | 5/1998 |
| JP | 3067911 | 4/2000 |
| JP | 2006-71032 A | 3/2006 |
| JP | 2010-007696 | 1/2010 |
| JP | 2013-181642 | 9/2013 |
| JP | 2014-005883 | 1/2014 |
| JP | 2014-70640 A | 4/2014 |

OTHER PUBLICATIONS

Search Report dated Jul. 1, 2021 issued in Chinese Application No. 201880078131.8 with English translation (5 pages).
Supplementary European Search Report dated Oct. 29, 2021 issued in European Application No. 18886288.2 (10 pages).

* cited by examiner

Fig. 7
(A) 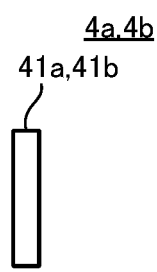
(B) 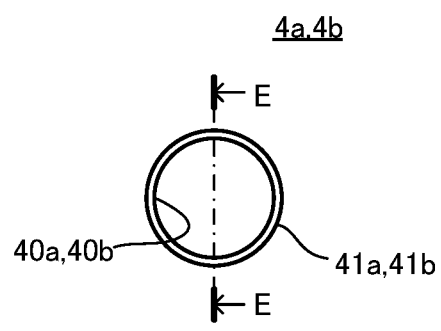
(C) 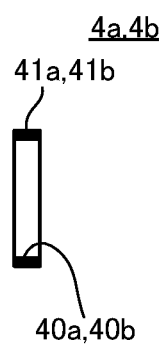

Fig. 12
(A)
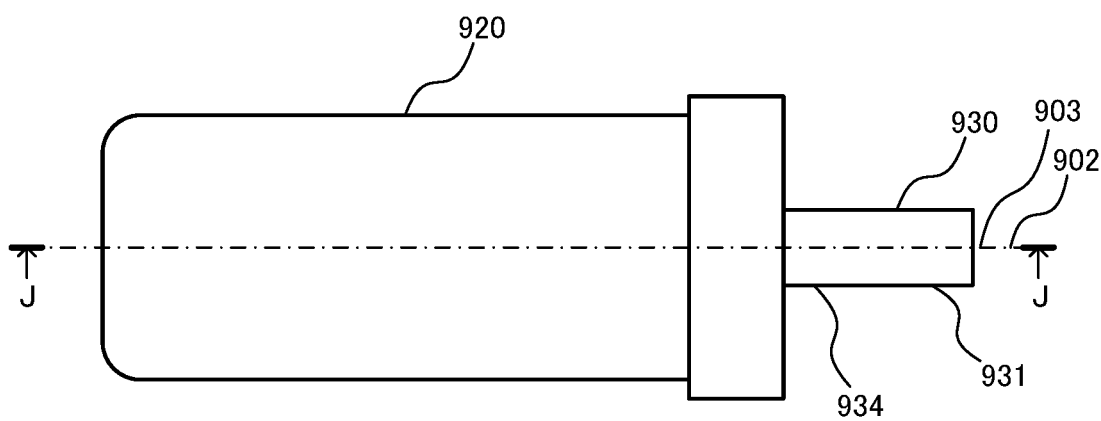
(B)
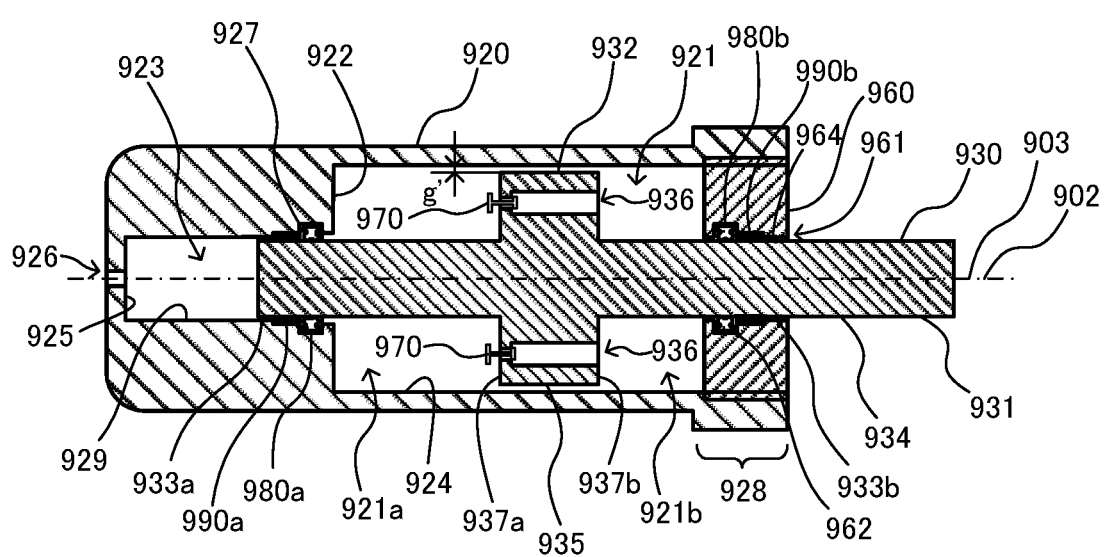

DAMPER

This application is the U.S. national phase of International Application No. PCT/JP2018/043017 filed 21 Nov. 2018, which designated the U.S. and claims priority to JP Patent Application No. 2017-236004 filed 8 Dec. 2017, the entire contents of each of which are hereby incorporated by reference.

TECHNICAL FIELD

The present invention relates to a damper that limits the movement of viscous fluid to apply a damping force in reaction to an external force.

BACKGROUND ART

A known damper gives a damping force in reaction to an external force by limiting a movement of a viscous fluid. This type of damper has a fluid holding chamber having opening sections and holding the viscous fluid, a resistance generating member partitioning an inside of the fluid holding chamber and inserted in the opening sections of the fluid holding chamber so as to move or rotate relative to the fluid holding chamber by receiving the external force, volume changing means partitioning the inside of the fluid holding chamber and capable of compressing one area and expanding another area within the partitioned fluid holding chamber according to the movement or the rotation of the resistance generating member relative to the fluid holding chamber, and a flow passage connecting between the areas within the fluid holding chamber partitioned by the volume changing means.

For example, the Patent Literature 1 discloses a rotary damper for generating a damping torque in reaction to an applied rotation force by limiting the movement of a viscous fluid. This rotary damper has a housing having an inner chamber with one end opened, a rotor housed within the inner chamber of the housing, the viscous fluid (fluid substance) filled within the inner chamber of the housing, and a plug attached to an opening side end of the housing so as to seal in the viscous fluid filled within the inner chamber of the housing. The housing and the plug together form the fluid holding chamber.

The rotor has a rotor body in a substantial circular cylinder shape and movable vanes projecting radially outward from an outer peripheral surface of the rotor body toward an inner peripheral surface of the inner chamber of the housing. The rotor body corresponds to the resistance generating member.

Fixed vanes are formed on the inner peripheral surface of the inner chamber of the housing, each projecting radially inward toward an outer peripheral surface of the rotor body to partition the inner chamber of the housing. The fixed vanes, with the movable vanes of the rotor, form the volume changing means together.

Flow passages (i.e. orifices) are formed through the respective fixed vanes of the housing so as to connect between the respective areas into which the inner chamber of the housing is partitioned by the respective fixed vanes.

A bottom of the inner chamber of the housing and the plug each include a through-hole for rotatable insertion of a corresponding end part of the rotor body. These through-holes correspond the opening sections of the fluid holding chamber. One end part of the rotor body is inserted into the through-hole formed in the bottom of the inner chamber of the housing, another end part of the rotor body is inserted into the through-hole formed in the plug, and the rotor is thereby housed within the inner chamber of the housing so as to be rotatable relative to this inner chamber.

In the structure as described above, as for the rotary damper, when the rotation force is applied to the rotor to rotate the rotor relative to the inner chamber of the housing, each of the movable vanes compresses the area located upstream in a rotor rotation direction from the corresponding fixed vane of the inner chamber and a pressure on the viscous fluid in this area is increased. This causes the viscous fluid in this area to pass through the flow passage formed in the corresponding fixed vane and to moves to the area located downstream in the rotor rotation direction from the corresponding fixed vane of the inner chamber. At this time, the damping torque generates depending on a resistance to motion of the viscous fluid (the degree to which the viscous fluid is hard to be moved through the flow passage).

CITATION LIST

Patent Literature

Patent Literature 1: Japanese Unexamined Patent Application Laid-Open No. 2014-005883

SUMMARY OF INVENTION

Technical Problem

Generally, in the damper for applying the damping force in reaction to the external force by limiting the movement of the viscous fluid, an O-ring made of an elastic body such as rubber is arranged between each opening section of the fluid holding chamber and the resistance generating member inserted in this opening section in order to prevent leakage of the viscous fluid held in the fluid holding chamber through a gap therebetween. Therefore, the following may occurs.

Specifically, it may occur that the external force applied to the resistance generating member deforms the O-ring elastically to deviate a center axis of the resistance generating member from a center axis of the fluid holding chamber, thus causing misalignment. In order to reduce such misalignment, stiffness of the O-ring is to be enhanced. Enhancement of the stiffness of the O-ring may, however, cause the O-ring to resist elastic deformation depending on the movement or the rotation of the resistance generating member and then generate a gap between the resistance generating member and the O-ring, thus resulting in leakage of the viscous fluid held in the fluid holding chamber through this gap.

Moreover, the O-ring, since having a circular cross-section, varies in respective contact areas between it and the resistance generating member and between it and the opening section of the fluid holding chamber when it is elastically deformed in its radial direction. This may lead to instability of a seal between the resistance generating member and the opening section of the fluid holding chamber, thus further increasing the likelihood of external leakage of the viscous fluid held in the fluid holding chamber through the gap therebetween.

The present invention has been made in view of the above situation, and an object of the invention is to provide a damper capable of ensuring against the leakage of the viscous fluid held in the fluid holding chamber.

Solution to Problem

In response to the above issue, for a damper of the present invention, a bushing is attached to an opening section of a fluid holding chamber so that a resistance generating member is slidably held by this bushing, and an elastic member in an annular shape is located between the resistance generating member held by this bushing and the opening section of the fluid holding chamber and has the following: an outer peripheral surface having a width in a direction of a center axis of the fluid holding chamber and being pressed against the fluid holding chamber; and an inner peripheral surface having a width in the direction of the center axis of the fluid holding chamber and being pressed against the resistance generating member.

For example, the present invention provides a damper for generating a damping force in reaction to an external force by limiting a movement of a viscous fluid, and the damper includes the following:

a fluid holding chamber having the opening section and holding the viscous fluid within;

a resistance generating member inserted in the opening section of the fluid holding chamber and movable relative to the fluid holding chamber in reaction to the external force;

volume changing means partitioning an inside of the fluid holding chamber and configured to compress one of areas within the fluid holding chamber partitioned and expand another of the areas, with a movement of the resistance generating member relative to the fluid holding chamber;

a flow passage connecting between the areas within the fluid holding chamber partitioned by the volume changing means;

a bushing attached to the opening section of the fluid holding chamber and holding slidable the resistance generating member inserted in the opening section of the fluid holding chamber; and an elastic member in an annular shape located between the resistance generating member held by the bushing and the opening section of the fluid holding chamber.

The elastic member includes the following:

an inner peripheral surface having the width in the direction of the center axis of the fluid holding chamber and being pressed against the resistance generating member; and an outer peripheral surface having the width in the direction of the center axis of the fluid holding chamber and being pressed against the fluid holding chamber.

Advantageous Effects of Invention

According to the present invention, the bushing attached to the opening section of the fluid holding chamber holds the resistance generating member slidable, therefore resulting in reduction of a misalignment of the resistance generating member even without enhancement of stiffness of the elastic member. This allows the elastic member to be designed to have low stiffness so that it can deform elastically depending on movement or rotation of the resistance generating member, thereby resulting in no gap between the resistance generating member and the elastic member to decrease the likelihood of external leakage of the viscous fluid held in the fluid holding chamber.

Furthermore, according to the present invention, the elastic member in an annular shape, which includes the inner peripheral surface and the outer peripheral surface each having the width in the direction of the center axis of the fluid holding chamber, is located between the resistance generating member held by bushing and the opening section of the fluid holding chamber. This enables resultant reduction of changes in respective contact areas between the elastic member and the resistance generating member and between the elastic member and the fluid holding chamber, even if misalignment of the resistance generating member occurs to cause elastic deformation of the elastic member in the radial direction. Consequently, seal tightness between the opening section of the fluid holding chamber and the resistance generating member becomes stable, thus resulting in further decrease of the likelihood of external leakage of the viscous fluid held in the fluid holding chamber.

BRIEF DESCRIPTION OF DRAWINGS

FIG. 7(A) and FIG. 7(B) are respectively a side view and a front view, of each of the first and second bushings 4a, 4b, and FIG. 7(C) is an E-E cross-section view of each of the first and second bushings 4a, 4b as illustrated in FIG. 7(B).

FIG. 12(A) is a side view of a linear type damper 9 according to another embodiment of the present invention, and FIG. 12(B) is a J-J cross-section view of the linear type damper as illustrated in FIG. 12(A).

DESCRIPTION OF EMBODIMENTS

Figure 1:
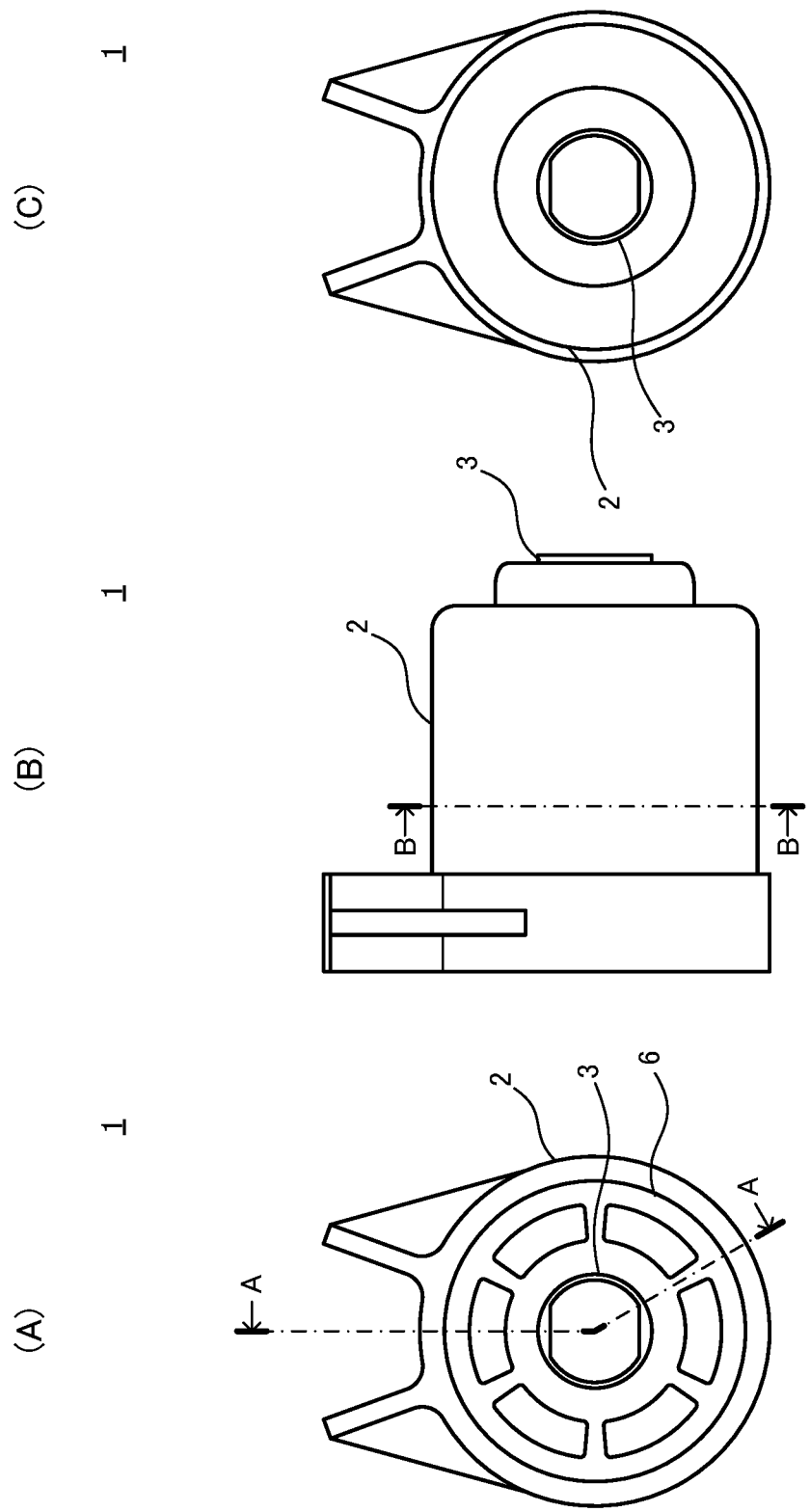
FIGS. 1(A) to 1(C) are respectively a front view, a side view, and a back view, of a rotary damper 1 according to one embodiment of the present invention.

In the following, one embodiment of the present invention will be described referring to the drawings.

Figure 2:
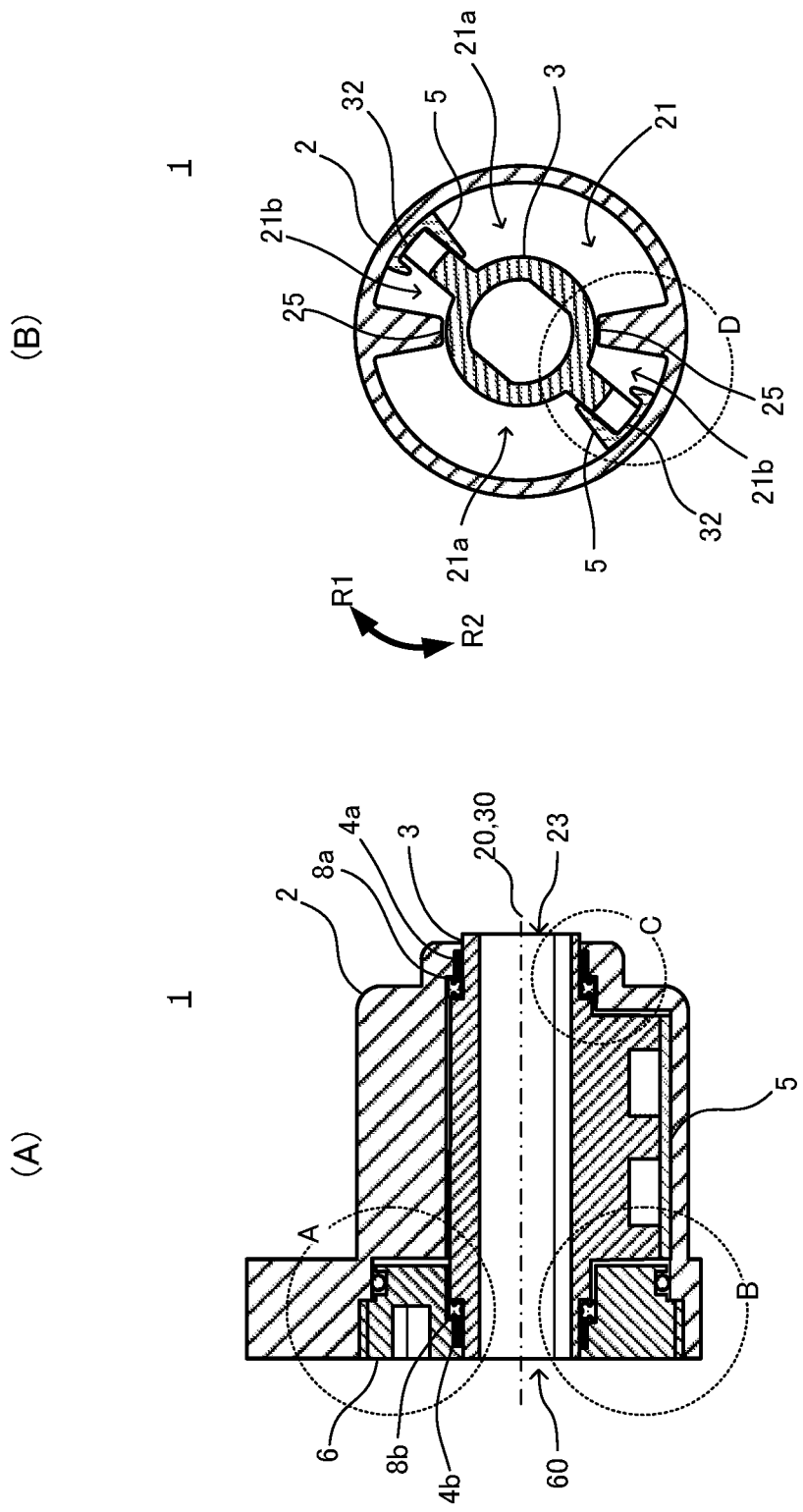
FIG. 2(A) is an A-A cross-section view of the rotary damper 1 as illustrated in FIG. 1(A)
FIG. 2(B) is a B-B cross-section view of the rotary damper 1 as illustrated in FIG. 1(B).
Figure 3:
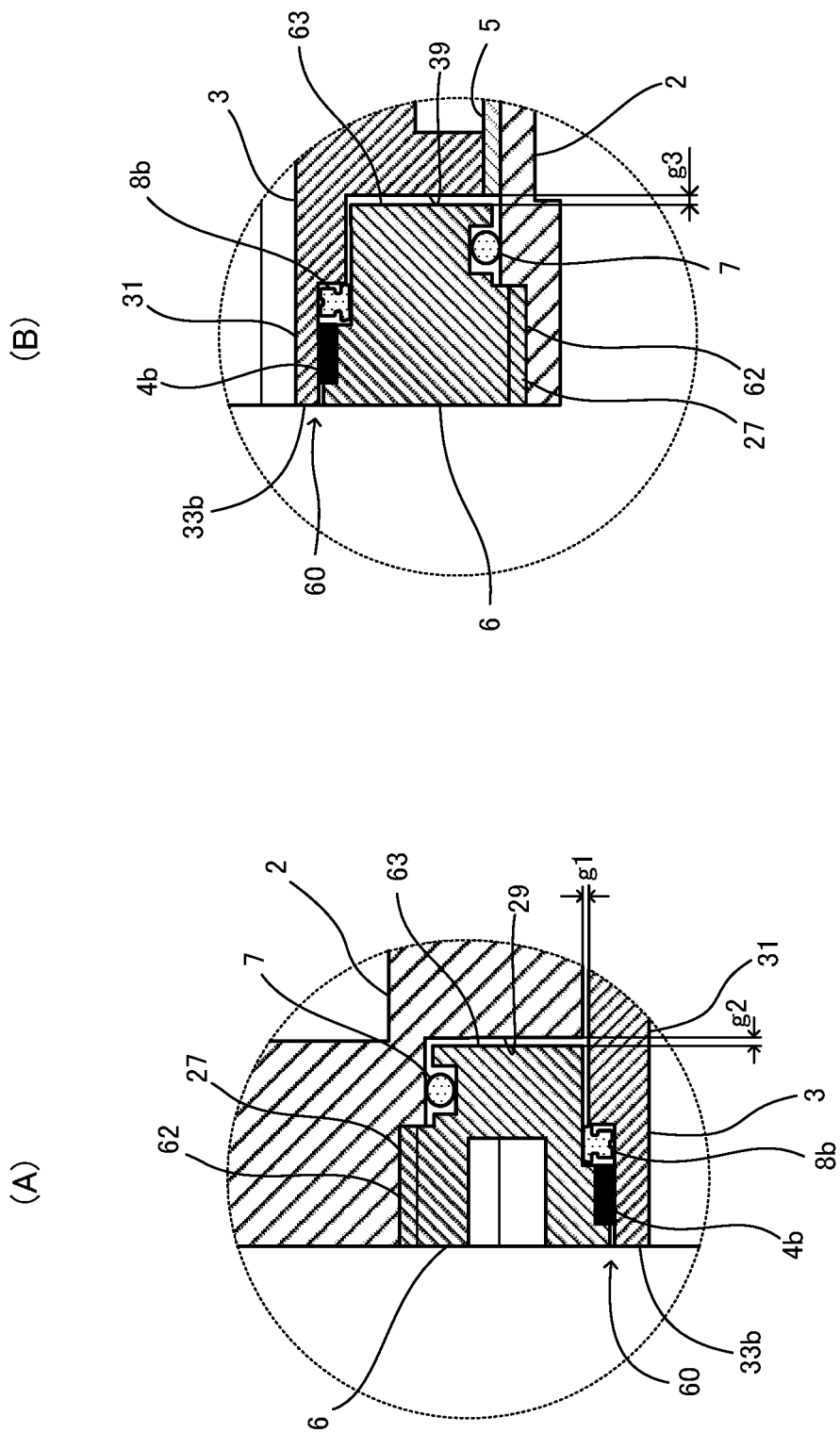
FIG. 3(A) and FIG. 3(B) are respectively an enlarged view of the part A and an enlarged view of the part B, of the rotary damper 1 as illustrated FIG. 2(A).
Figure 4:
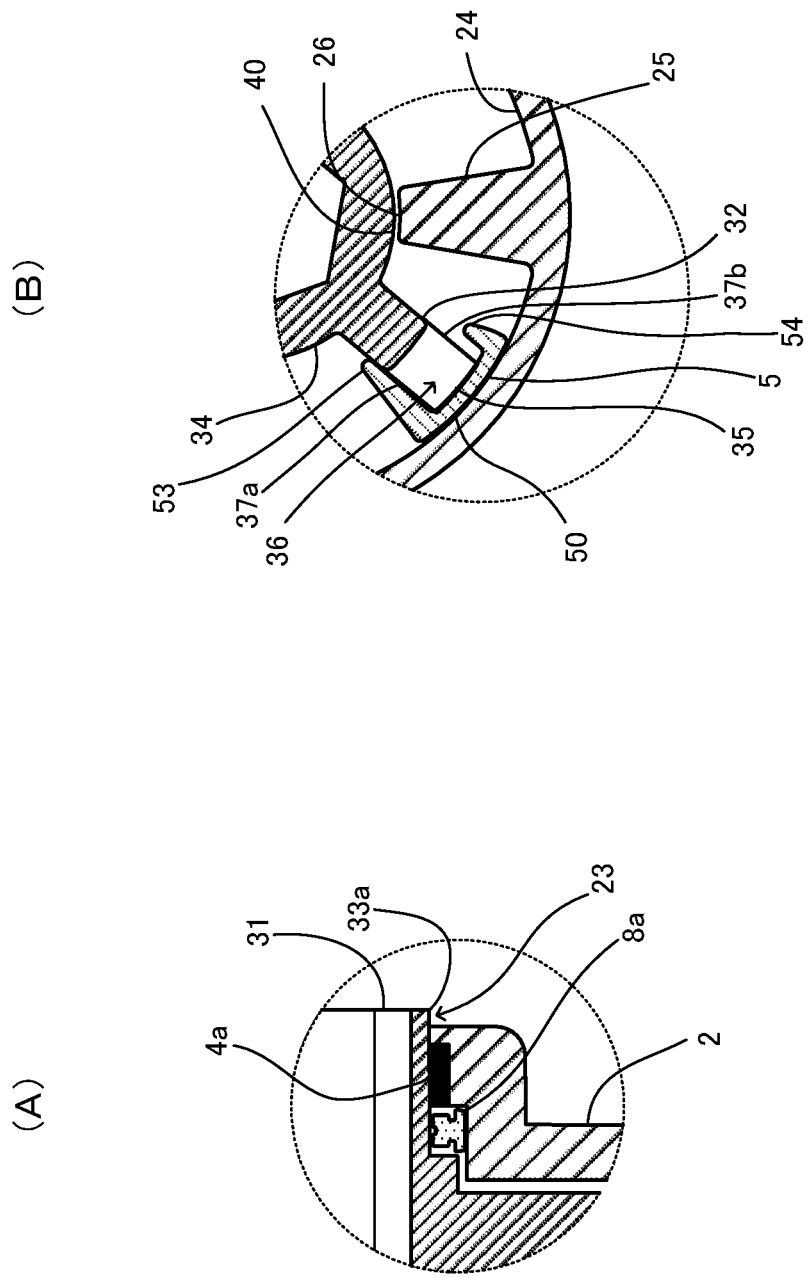
FIG. 4(A) is an enlarged view of the part C of the rotary damper 1 as illustrated FIG. 2(A)
FIG. 4(B) is an enlarged view of the part D of the rotary damper 1 as illustrated in FIG. 2(B).

FIGS. 1(A) to 1(C) are respectively a front view, a side view, and a back view, of a rotary damper 1 according to the embodiment of the present invention. FIG. 2(A) is an A-A cross-section view of the rotary damper 1 as illustrated in FIG. 1(A), and FIG. 2(B) is a B-B cross-section view of the rotary damper 1 as illustrated in FIG. 1(B). FIG. 3(A) and FIG. 3(B) are respectively an enlarged view of the part A and an enlarged view of the part B, of the rotary damper 1 as illustrated FIG. 2(A). FIG. 4(A) is an enlarged view of the part C of the rotary damper 1 as illustrated FIG. 2(A), and FIG. 4(B) is an enlarged view of the part D of the rotary damper 1 as illustrated in FIG. 2(B).

The rotary damper 1 according to the present embodiment can be used for any device in which a rotational motion of a bi-directionally rotatable rotator is to be damped, such as seats with reclining function for use in any apparatuses, for example, automobiles, railroad vehicles, aircrafts, and vessels. As illustrated in the figures, the rotary damper 1 according to the present embodiment includes the following: a case 2 and a lid 6 that form a fluid holding chamber holding a viscous fluid (not illustrated in the figures), such as oil or silicone; and a rotor 3 housed in the fluid holding chamber so as to be rotatable relative to the fluid holding chamber.

Figure 5:
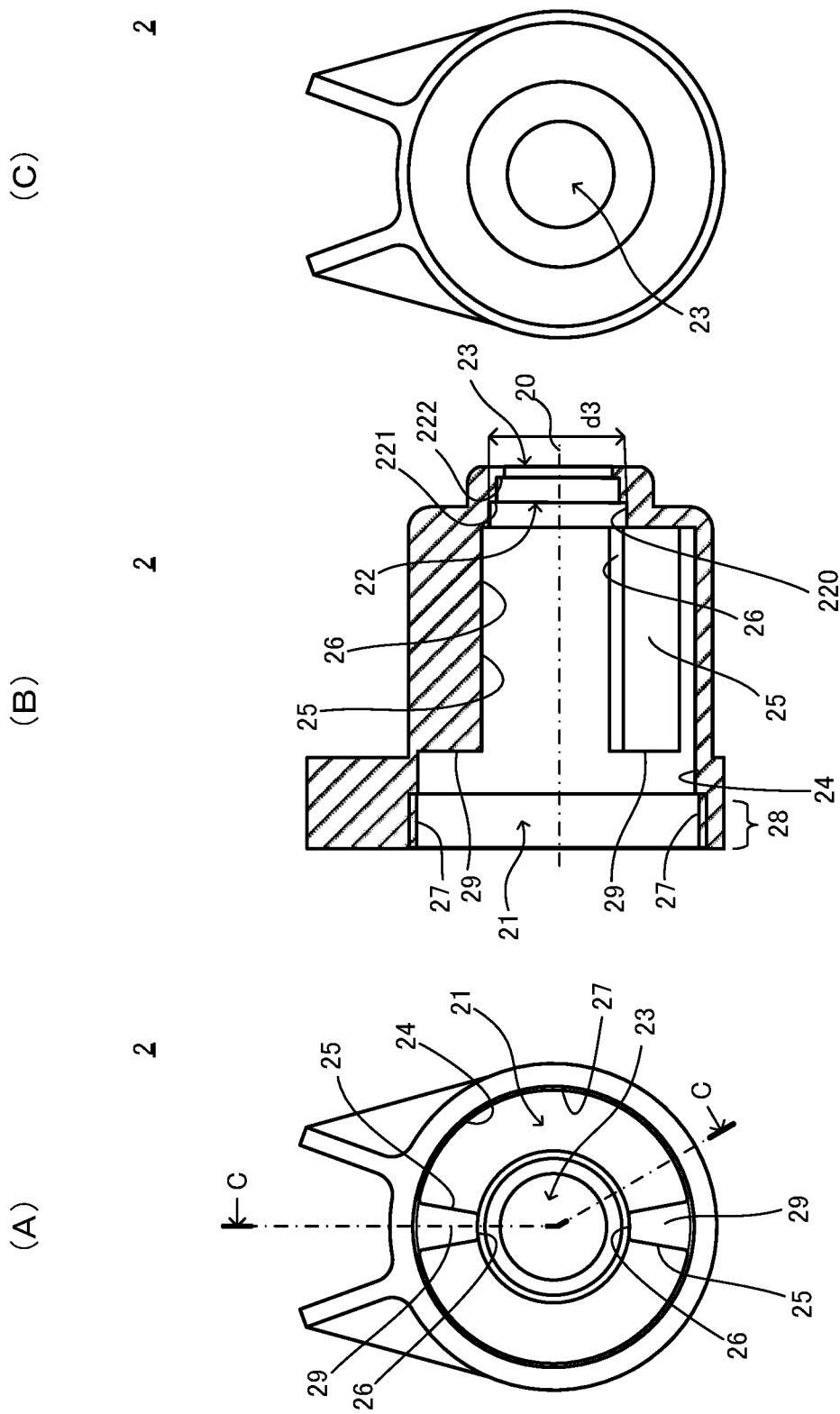
FIG. 5(A) is a front view of a case 2.
FIG. 5(B) is a C-C cross-section view of the case 2 as illustrated in FIG. 5(A)
FIG. 5(C) is a back view of the case 2.

FIG. 5(A) is a front view of the case 2, FIG. 5(B) is a C-C cross-section view of the case 2 as illustrated in FIG. 5(A), and FIG. 5(C) is a back view of the case 2.

Figure 6:
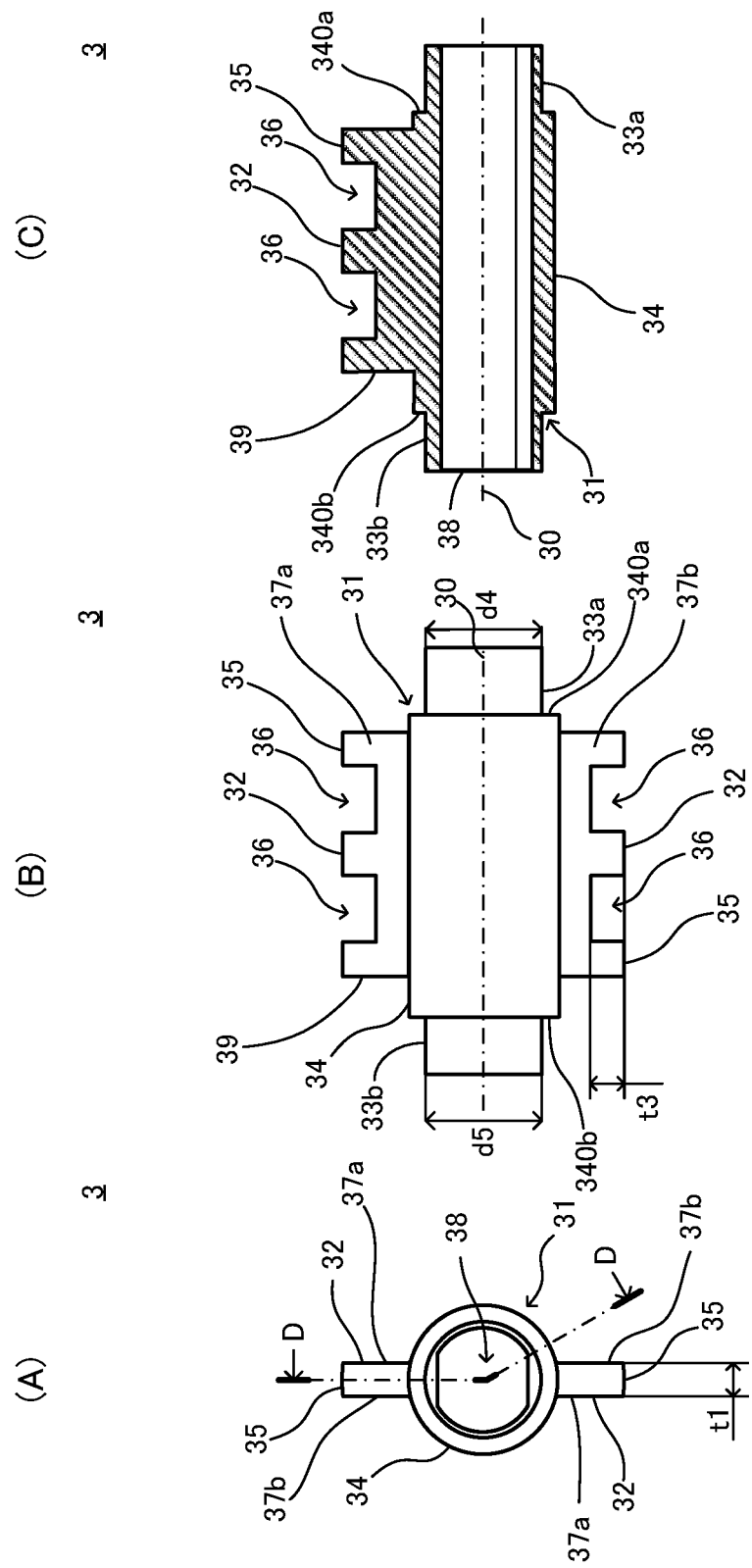
FIG. 6(A) and FIG. 6(B) are respectively a front view and a side view, of a rotor 3.
FIG. 6(C) is a D-D cross-section view of the rotor 3 as illustrated in FIG. 6(A).

As illustrated in the figures, a circular cylindrical chamber 21 with one end opened (i.e. a space having a circular cylindrical shape with a bottom) is formed inside of the case 2, and a through-hole 23 for insertion of the rotor 3 is formed in a bottom part 22 of this circular cylindrical chamber 21 so as to serve as an opening section of the fluid holding chamber. Below-mentioned first sealing ring 8a and first bushing 4a (See FIG. 4(A)) are fitted in this through-hole 23; a lower end part 33a of a below-mentioned rotor body 31 (See FIG. 6) is inserted into the through-hole 23 in which these first sealing ring 8a and first bushing 4a are already fitted, and the rotor 3 is thereby housed within the circular cylindrical chamber 21 so as to align a rotation axis 30 of the rotor 3 with a center axis 20 of the circular cylindrical chamber 21 (See FIG. 2(A) and FIG. 4(A)). A step 221 and a step 222 are formed on an inner peripheral surface 220 of the through-hole 23 of the circular cylindrical chamber 21 so as to restrict respectively the first sealing ring 8a and the first bushing 4a from moving axially outward (i.e. toward the outside of the case 2 in an axial direction of the rotary damper 1).

Figure 9:
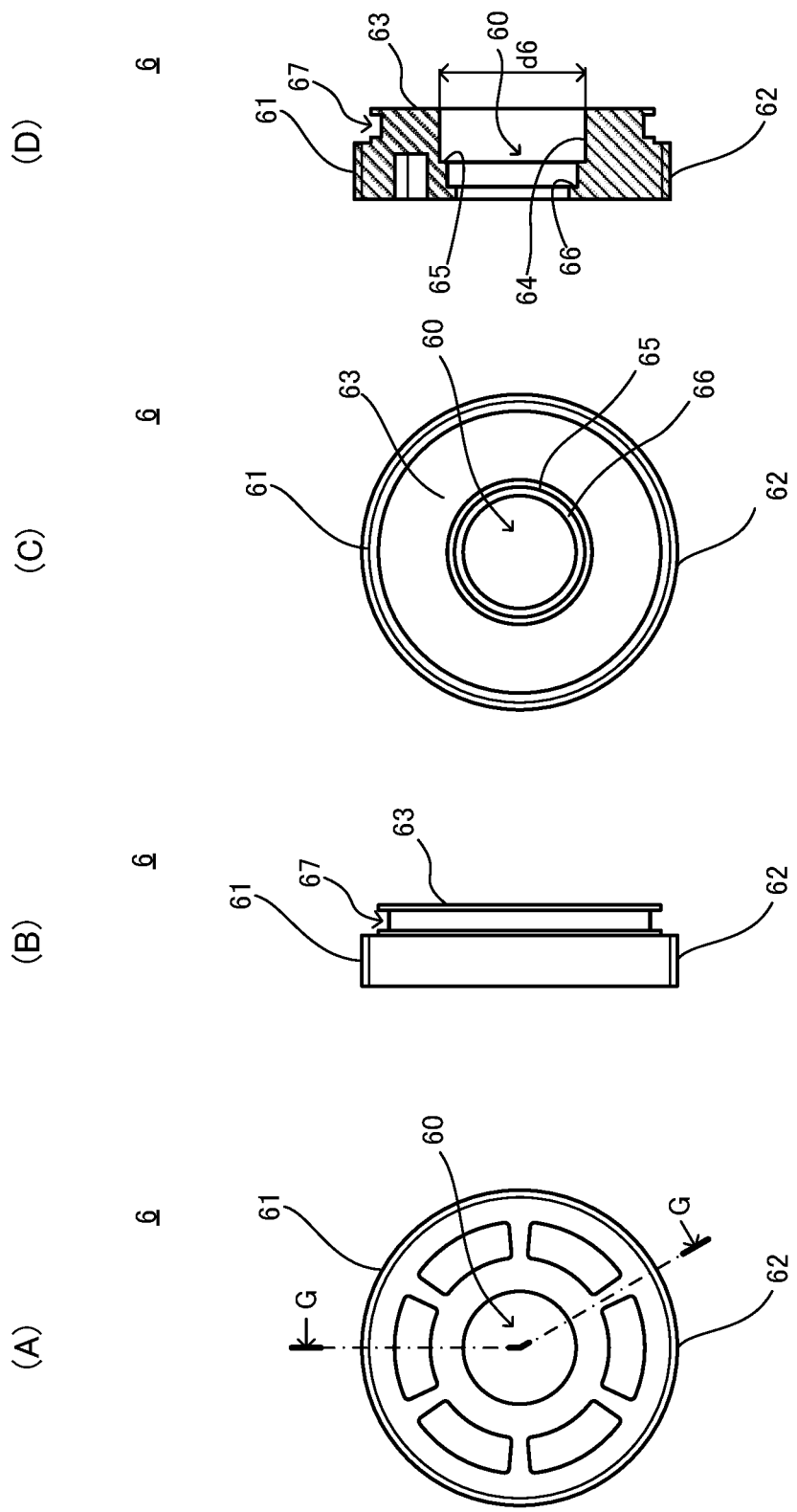
FIGS. 9(A) to 9(C) are a front view, a side view, and a back view, of a lid 6.
FIG. 9(D) is a G-G cross-section view of the lid 6 as illustrated in FIG. 9(A).

A pair of partitioning parts 25 along the center axis 20 of the circular cylindrical chamber 21 is formed on an inner peripheral surface 24 of the circular cylindrical chamber 21 so as to be axisymmetrically with respect to this center axis 20, and the partitioning parts 25 project radially inward so as to place respective front faces 26 close to an outer peripheral surface 34 of the below-mentioned rotor body 31 (See FIG. 6) of the rotor 3, thereby partitioning an inside of the circular cylindrical chamber 21. Moreover, an internal threaded section 27 is formed on an opening side 28 of the inner peripheral surface 24 of the circular cylindrical chamber 21 so as to be screwed onto a below-mentioned external threaded section 62 (See FIG. 9) of the lid 6.

FIG. 6(A) and FIG. 6(B) are respectively a front view and a side view, of the rotor 3, and FIG. 6(C) is a D-D cross-section view of the rotor 3 as illustrated in FIG. 6(A).

As illustrated in the figures, the rotor 3 includes the rotor body 31 in a cylindrical shape and a pair of vanes (rotor blades) 32 formed axisymmetrically with respect to the rotation axis 30 of the rotor body 31.

Each of the vanes 32 is formed along the rotation axis 30 of the rotor 31 and projects radially outward from the outer peripheral surface 34 of the rotor body 3 so as to place a corresponding front face 35 close to the inner peripheral surface 24 of the circular cylindrical chamber 21 inside the case 2, thereby partitioning the inside of the circular cylindrical chamber 21. The vanes 32, along with the partitioning parts 25 of the circular cylindrical chamber 21 within the case 2, form volume changing means to compress and expand respectively one area and another area into which the fluid holding chamber is partitioned by the vanes 32.

A flow passage 36 is formed in each of the vanes 32 along a rotation direction of the rotor 3 so as to pass through both side faces 37a, 37b of the corresponding vane 32. Moreover, a valve seal 5 is attached to each of the vanes 32 (See FIG. 2(B) and FIG. 4(B)).

The rotor body 31 of the rotor 3 works as a resistance generating member capable of rotating relative to the fluid holding chamber in reaction to an external force. For the rotor body 31, the lower end part 33a is to be rotatably inserted into the through-hole 23 formed in the bottom part of the circular cylindrical chamber 21 within the case 2 (See FIG. 2(A) and FIG. 4(A)) and an upper end part 33b is to be rotatably inserted into a below-mentioned through-hole (See FIG. 9) in the lid 6 (See FIG. 2(A), FIG. 3(A), and FIG. 3(B)).

The rotor body 31 includes a insertion hole 38 formed with the rotation axis 30 as center so that a shaft with machined double flats (not illustrated in the figures) for transmitting the external rotation force to the rotor 3 is to be inserted into the hole 38. The lower end part 33a of the rotor body 31 is to be rotatably inserted into below-mentioned first sealing ring 8a and the first bushing 4a both attached to the through-hole 23 of the circular cylindrical chamber 21 inside the case 2 (See FIG. 4(A)). A step 340a is formed on the outer peripheral surface 34 of the lower end part 33a of the rotor body 31 so as to restrict the first sealing ring 8a and the first bushing 4a from moving axially inward (i.e. toward the inside of the case 2 in the axial direction of the rotary damper 1). The upper end part 33b of the rotor body 31, whereas, is to be rotatably inserted into a second sealing ring 8b and a second bushing 4b both attached to the below-mentioned through-hole 60 in the lid 6 (See FIG. 3(A) and FIG. 3(B)). Furthermore, a step 340b is formed on the outer peripheral surface 34 of the upper end part 33b of the rotor body 31 so as to restrict the second sealing ring 8b and the second bushing 4b from moving axially inward.

FIG. 7(A) and FIG. 7(B) are respectively a side view and a front view, of each of the first and second bushings 4a, 4b, and FIG. 7(C) is an E-E cross-section view of each of the first and second bushings 4a, 4b as illustrated in FIG. 7(B).

As illustrated in the figures, the first bushing 4a and the second bushing 4b are each a cylindrical member made of material excellent in sliding properties: the first bushing 4a has an inner peripheral surface 40a slidable relative to the outer peripheral surface 34 of the lower end part 33a of the rotor body 31 of the rotor 3 and an outer peripheral surface 41a to abut the inner peripheral surface 220 of the through-hole 23 of the circular cylindrical chamber 21 inside the case 2, and the second bushing 4b has an inner peripheral surface 40b slidable relative to the outer peripheral surface 34 of the upper end part 33b of the rotor body 31 of the rotor 3 and an outer peripheral surface 41b to abut an inner peripheral surface 64 of the through-hole 60 in the lid 6 (See FIG. 9(D)).

The first bushing 4a and the second bushing 4b are each made of metal, such as brass alloy, or synthetic resin, such as PTFE (polytetrafluoroethylene), polyacetal resin, polyethylene resin, polyamide resin, and polyphenylene sulfide resin. Alternatively, the first bushing 4a and the second bushing 4b may each be made of such multi-layer sliding material in which a plurality of sliding layers are formed on an inner peripheral surface of a backing material, such as cylindrical steel plate or resin composite in a cylindrical shape. Used may be a multi-layer sliding material such that a sintered metallic layer is formed on an inner peripheral surface of a backing material made of a cylindrical steel plate and a sliding resin layer containing PTFE is further formed overlying there, for example.

Figure 8:
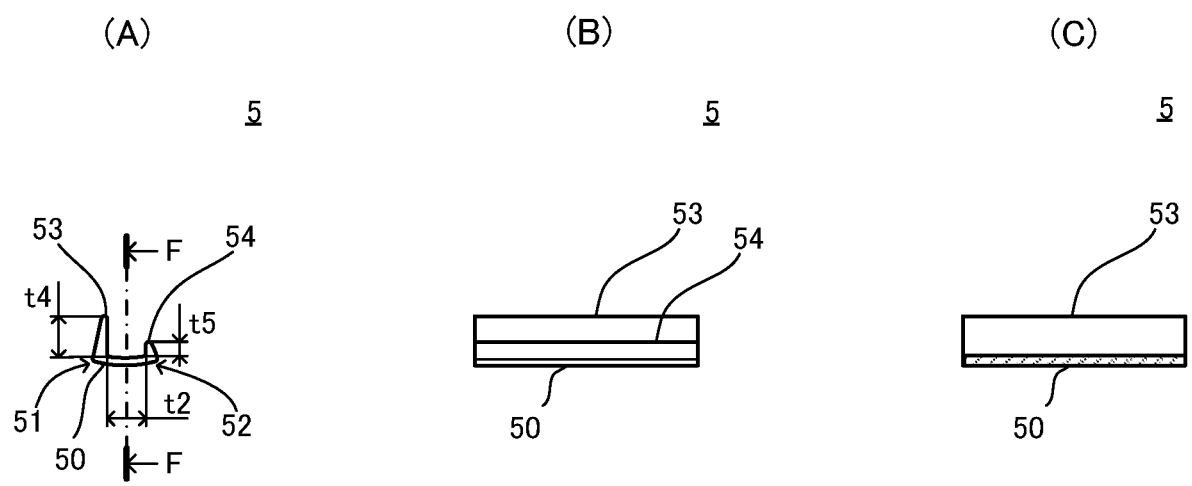
FIG. 8(A) and FIG. 8(B) are respectively a front view and a side view, of a valve seal 5.
FIG. 8(C) is an F-F cross-section view of the valve seal 5 as illustrated in FIG. 8(A).

FIG. 8(A) and FIG. 8(B) are respectively a front view and a side view, of the valve seal 5, and FIG. 8(C) is an F-F cross-section view of the valve seal 5 as illustrated in FIG. 8(A).

As illustrated in the figures, each of the valve seals 5, which has a U-shape attachable to the corresponding vane 32 of the rotor 3, includes a bottom part 50 having a width t2 longer than a rotational directional width t1 (See FIG. 6(A)) of the corresponding vane 32, a first branch 53 formed integrally with one edge 51 of the bottom part 50 and having a width t4 longer than a radial directional width t3 (See FIG. 6(B)) of the flow passage 36 formed through the corresponding vane 32, and a second branch 54 formed integrally with another edge 52 of the bottom part 50 and having a width t5 shorter than the radial directional width t3 of the flow passage 36 formed through the corresponding vane 32.

The valve seals 5 attached to the vanes 32 is each located so as to interpose the bottom part 50 between the front face 35 of the corresponding vane 32 and the inner peripheral surface 24 of the circular cylindrical chamber 21 inside the case 2, thereby sealing a gap therebetween (See FIG. 4(B)). As illustrated in FIG. 2(B), rotating the rotor 3 in a first rotating direction R1 relative to the circular cylindrical chamber 21 inside the case 2, causes each of the valve seal 5 to bring the first branch 53 into contact with one side face 37a of the corresponding vane 32, thereby closing the flow passage 36 formed through each of the vanes 32. And conversely, rotating the rotor 3 in a second rotating direction R2, namely in the direction opposite to the first rotating direction R1, relative to the circular cylindrical chamber 21 inside the case 2, causes each of the valve seals 5 to move the first branch 53 away from one side face 37a of the corresponding vane 32 and to bring the second branch 54 into contact with another side face 37b of the corresponding vane 32, thereby opening the flow passage 36 formed through each of the vanes 32 (See FIG. 4(B)).

Since each of the valve seals 5 is arranged between the case 2 and the rotor 3 which are rotatable relative to each other, material excellent in sliding properties, for example, synthetic resin, such as polyamide resin, may be preferably used for each the valve seals 5.

FIGS. 9(A) to 9(C) are a front view, a side view, and a back view, of the lid 6, and FIG. 9(D) is a G-G cross-section view of the lid 6 as illustrated in FIG. 9(A).

As illustrated in the figures, on the lid 6, the through-hole 60 for insertion of the rotor 3 is formed at a place opposite to the through-hole 23 formed in the bottom part 22 of the circular cylindrical chamber 21 inside the case 2 so as to serve as an opening section of the fluid holding chamber. The second sealing ring 8b and the second bushing 4b (See FIG. 3(A)) each being described below, are attached to this through-hole 60, and the upper end part 33b of the rotor body 31 of the rotor 3 is to be inserted into the through-hole 60 in which these second sealing ring 8b and second bushing 4b are already fitted. A step 65 and a step are formed on the inner peripheral surface 64 of the through-hole 60 so as to prevent the second sealing ring 8b and the second bushing 4b from moving axially outward, respectively.

On an outer peripheral surface 61 of the lid 6, the external threaded section 62 is formed so as to be screwed into the internal threaded section 27 formed on the opening side 28 of the inner peripheral surface 24 of the circular cylindrical chamber 21, and furthermore a circumferential groove 67 for installation of an O-ring 7 is also formed on the lower face 63 side in relation to the external threaded section 62. The O-ring 7 is installed in the groove 67 and is interposed between the outer peripheral surface 61 of the lid 6 and the inner peripheral surface 24 of the circular cylindrical chamber 21, thereby preventing the viscous fluid from leaking outside through a threaded engagement section between the external threaded section 62 of the lid 6 and the internal threaded section 27 of the circular cylindrical chamber 21 (See FIG. 3(A) and FIG. 3(B)).

FIG. 10(A) is a front view of each of the first and second sealing rings 8a, 8b, FIG. 10(B) is an H-H cross-section view of each of the first and second sealing rings 8a, 8b as illustrated in FIG. 10(A), FIG. 10(C) is an enlarged view of the part E of each of the first and second sealing rings 8a, 8b as illustrated in FIG. 10(A), and FIG. 10(D) is an enlarged view of the part F of the first and second sealing rings 8a, 8b as illustrated in FIG. 10(B).

As illustrated in the figures, the first sealing ring 8a and the second sealing ring 8b are each an annular member made of elastic material, such as nitrile butadiene rubber (NBR): the first sealing ring 8a has an inner diameter d1 smaller than an outer diameter d4 of the lower end part 33a of the rotor body 31 of the rotor 3 and an outer diameter d2 larger than an inner diameter (an outer diameter of the step 221) d3 of the through-hole 23 of the circular cylindrical chamber 21 inside the case 2; and the second sealing ring 8b has an inner diameter d1 smaller than an outer diameter d5 of the upper end part 33b of the rotor body 31 of the rotor 3 and an outer diameter d2 larger than an inner diameter (an outer diameter of the step 65) d6 of the through-hole 60 in the lid 6. Moreover, the first sealing ring 8a and the second sealing ring 8b each include an inner peripheral annular part 81 rectangular in cross-section, an outer peripheral annular part 82 rectangular in cross-section, and a coupling part 83.

The inner peripheral annular part 81 of each ring 8a, 8b includes an inner peripheral surface 84 having a width t6 that is flat in a direction of a center axis 80 coincident with the center axis 20 of the circular cylindrical chamber inside the case 2. The first sealing ring 8a and the second sealing ring 8b each enable resultant reduction of any change in contact area between the corresponding inner peripheral surface 84 and its counterpart surface upon being elastically deformed in the radial direction because the corresponding inner peripheral surface 84 has the width t6 that is flat in the direction of the center axis 80. It is noted that the inner peripheral surface 84 of the first sealing ring 8a is pressed against the outer peripheral surface 34 of the lower end part 33a of the rotor body 31 of the rotor 3 and that of the second sealing ring 8b is pressed against the outer peripheral surface 34 of the upper end part 33b of the rotor body 31 of the rotor 3. A circumferential grease groove 86 is formed in the inner peripheral surface 84, and grease is filled in this grease groove 86. It is one circumferential grease groove 86 here that is formed in the inner peripheral surface 84; however, a plurality of circumferential grease grooves 86 may be formed in the inner peripheral surface 84.

The outer peripheral annular part 82 of each ring 8a, 8b includes an outer peripheral surface 85 having a width t7 that is flat in the direction of the center axis 80 coincident with the center axis 20 of the circular cylindrical chamber 21 inside the case 2. The first sealing ring 8a and the second sealing ring 8b each enable resultant reduction of any change in contact area between the corresponding outer peripheral surface 85 and its counterpart surface upon being elastically deformed in the radial direction because the corresponding outer peripheral surface 85 has the width t7 that is flat in the direction of the center axis 80. It is noted that the outer peripheral surface 85 of the first sealing ring 8a is pressed against the inner peripheral surface 220 of the through-hole 23 of the circular cylindrical chamber 21 inside the case 2, and that of the second sealing ring 8b is pressed against the inner peripheral surface 64 of the through-hole 60 in the lid 6.

Here, for each ring, the width t6 of the inner peripheral surface 84 of the inner peripheral annular part 81 is narrower than the width t7 of the outer peripheral surface 85 of the outer peripheral annular part 82 (t6<t7). This results in a friction coefficient of the inner peripheral surface 84 of each inner peripheral annular part 81 smaller than a friction coefficient of the outer peripheral surface 85 of the corresponding outer peripheral annular part 82. Consequently, when the rotor 3 rotates relative to the circular cylindrical chamber 21 within the case 2, sliding occurs between the inner peripheral surface 84 with a smaller frictional resistance of the inner peripheral annular part 81 and the outer peripheral surface 34 of the part against which this inner peripheral surface 84 is pressed, namely the lower end part 33a or the upper end part 33b of the rotor body 31 of the rotor 3, while the outer peripheral surface 85 with a larger frictional resistance of the outer peripheral annular part 82 remains in close contact with and without sliding on the surface against which this outer peripheral surface 85 is pressed, namely the inner peripheral surface 220 of the through-hole 23 of the circular cylindrical chamber 21 inside the case 2 or the inner peripheral surface 64 of the through-hole 60 in the lid 6.

However, when rubber hardness of the first sealing ring 8a and that of the second sealing ring 8b each fall within the range of 30 Shore (A) to 60 Shore (D), the ratio of the width t6 of the inner peripheral surface 84 of the corresponding inner peripheral annular part 81 to the width t7 of the outer peripheral surface 85 of the corresponding outer peripheral annular part 82 may be preferably given by t7/t6≤3. Where t7/t6>3, the width t7 of the outer peripheral surface 85 of the outer peripheral annular part 82 is too long compared to the width t6 of the inner peripheral surface 84 of the inner peripheral annular part 81; an edge part of the outer peripheral surface 85 of the outer peripheral annular part 82 becomes bent radially inward, and therefore the intended sealablity may not be provided. In addition, this may result in the need for larger installation space for the first sealing ring 8a or for the second sealing ring 8b.

Where rubber hardness of the first sealing ring 8a and that of the second sealing ring 8b each fall within the range of 30 Shore (A) to 60 Shore (D), a width t9 of the grease groove 86 provided on the inner peripheral surface 84 of the corresponding inner peripheral annular part 81 (in the case of a plurality of grease grooves 86 provided on the inner peripheral surface 84, t9 represents combined width of these grease grooves 86) may preferably has the following relation to the width t6 of the inner peripheral surface 84 of the corresponding inner peripheral annular part 81: 0.05≤t9/t6≤0.5. The t9/t6 less than 0.05 causes retaining amount of the lubricating grease within the grease groove 86 to decrease, and this may result in sliding performance degradation. On the other hand, the t9/t6 greater than 0.5 causes the contact area between the inner peripheral surface of the inner peripheral annular part 81 and the surface (the outer peripheral surface 34 of the lower end part 33a or the upper end part 33b of the rotor body 31 of the rotor 3) against which the inner peripheral surface 84 is pressed to become too small, and this may result in sealability degradation.

The coupling part 83 is located between the inner peripheral annular part 81 and the outer peripheral annular part 82 to provide a connection between the two. The coupling part 83 has a width t8 (t8<t6<t7) smaller in the direction of the center axis 80 than both the width t6 of the inner peripheral annular part 81 (the width of the inner peripheral surface 84) and the width t7 of the outer peripheral annular part 82 (the width of the outer peripheral surface 85). When the first sealing ring 8a and the second sealing ring 8b each are subject to a stress, this allows the corresponding coupling part 83 to be deformed elastically so as to absorb the stress, thereby restraining the corresponding inner peripheral annular part and the corresponding outer peripheral annular part 82 from being elastically deformed.

Here, when rubber hardness of the first sealing ring 8a and that of the second sealing ring 8b each fall within the range of 30 Shore (A) to 60 Shore (D), the ratio of the width t8 of the corresponding coupling part 83 to the width t6 of the corresponding inner peripheral annular part 81, may be preferably given by 0.3≤t8/t6≤0.95. The t8/t6 smaller than 0.3 causes stiffness of the corresponding coupling part 83 to decrease, thereby allowing pressing force exerted on the outer peripheral surface 34 of the lower end part 33a or of the upper end part 33b of the rotor body 31 of the rotor 3 by the inner peripheral surface 84 of the inner peripheral annular part 81 to become too small, and this may result in sealability degradation. On the other hand, the t8/t6 greater than 0.95 causes stiffness of the corresponding coupling part 83 to increase, thereby allowing pressing force exerted on the outer peripheral surface 34 of the lower end part 33a or of the upper end part 33b of the rotor body 31 of the rotor 3 by the inner peripheral surface of the inner peripheral annular part 81 to become too strong, and this may results in sliding performance degradation.

For the rotary damper 1 with the structure as described above, when the rotor 3 is rotationally moved in the first rotating direction R1 relative to the circular cylindrical chamber 21 inside the case 2 (See FIG. 2(B)), the first branch 53 of the valve seal 5 attached to each of the vanes 32 of the rotor 3 is brought into contact with one side face 37a of the corresponding vane 32, thereby closing the flow passage 36 formed through the corresponding vane 32. In the meanwhile, each of the valve seals 5 seals the gap between the front face 35 of the corresponding vane 32 and the inner peripheral surface 24 of the circular cylindrical chamber 21 inside the case 2 (See FIG. 4(B)). Consequently, movement of the viscous fluid filled within the circular cylindrical chamber 21 is only allowed through a gap g1 between the front face 26 of each partitioning part 25 of the circular cylindrical chamber 21 inside the case 2 and the outer peripheral surface 34 of the rotor body 31 of the rotor 3, a gap g2 between an upper face 29 of each partitioning part 25 and a lower face 63 of the lid 6, a gap g3 between the lower face 63 of the lid 6 and an upper face 39 of each vane 32 of the rotor 3, and the like (See FIG. 3(A) and FIG. 3(B)), thereby increasing pressure on viscous fluid in each area 21a (See FIG. 2(B)) partitioned by the corresponding vane 32 and the corresponding partitioning part 25 located in the first rotating direction R1 relative to the corresponding vane 32. Therefore, a high damping torque generates.

To the contrary, when the rotor 3 is rotationally moved in the second rotating direction R2 relative to the circular cylindrical chamber 21 inside the case 2 (See FIG. 2(B)), the first branch 53 of the valve seal 5 attached to each of the vanes 32 of the rotor 3 moves away from one side face 37a of the corresponding vane 32, thereby opening the flow passage 36 formed through the corresponding vane 32. Consequently, the viscous fluid filled within the circular cylindrical chamber 21 moves not only through the above gaps g1 to g3 and the like, but also through the flow passage 36 formed in each of the vanes 32, and therefore pressure on the viscous fluid within each area 21b (See FIG. 2(B)) partitioned by the corresponding vane 32 and the corresponding partitioning part 25 located in the second rotating direction R2 relative to the corresponding vane 32 does not become increased as compared to that of the case of rotating the rotor 3 in the first rotating direction R1 relative to the circular cylindrical chamber 21 inside the case 2. This results in generation of a lower damping torque than that of the case of rotating the rotor 3 in the first rotating direction R1 relative to the circular cylindrical chamber 21 inside the case 2.

Hereinabove, one embodiment of the present invention has been described.

According to the present embodiment, the rotor 3 is slidably held by both of the first bushing 4a and the second bushing 4b respectively attached to the through-hole 23 of the circular cylindrical chamber 21 inside the case 2 and the through-hole 60 in the lid 6, and therefore the misalignment of the rotor 3 is suppressed even without enhancement of the stiffness of the first sealing ring 8a and the second sealing ring 8b which along with the first bushing 4a and the second bushing 4b hold the rotor 3 slidable. This enables the first sealing ring 8a and the second sealing ring 8b to be each designed to have such low stiffness that the both rings 8a, 8b can be elastically deformed depending on the rotation of the rotor 3, thereby resulting in no gap both between the rotor 3 and the first sealing ring 8a and between the rotor 3 and the second sealing ring 8b and in resultant decrease of the likelihood of external leakage of the viscous fluid held in the circular cylindrical chamber 21 inside the case 2.

Furthermore, in the present embodiment, the first sealing ring 8a is located between the through-hole 23 of the circular cylindrical chamber 21 inside the case 2 and the lower end part 33a of the rotor body 31 of the rotor 3, and is an elastic member having the outer and inner peripheral surfaces 85, 84, namely, the outer peripheral surface 85 having the width t7 that is flat in the direction of the center axis 20 of the circular cylindrical chamber 21 and being pressed against the inner peripheral surface 220 of the through-hole 23, and the inner peripheral surface 84 having the width t6 that is flat in the direction of the center axis 20 of the circular cylindrical chamber 21 and being pressed against the outer peripheral surface 34 of the lower end part 33a of the rotor body 31; whereas the second sealing ring 8b is located between the through-hole 60 in the lid 6 and the upper end part 33b of the rotor body 31, and is an elastic member having the outer and inner peripheral surfaces 85, 84, namely, the outer peripheral surface 85 having the width t7 that is flat in the center axis 20 of the circular cylindrical chamber 21 and being pressed against the inner peripheral surface 64 of the through-hole 60, and the inner peripheral surface 84 having the width t6 that is flat in the center axis 20 of the circular cylindrical chamber 21 and being pressed against the outer peripheral surface 34 of the upper end part 33b of the rotor body 31.

This enables resultant reduction of the changes in the following contact areas upon occurrence of misalignment of the rotor 3 causing elastic deformation of each of the first and second sealing rings 8a, 8b in the radial direction, in comparison with the case of using an O-ring with a circular cross-section as an alternative to each of the first and second sealing rings 8a, 8b: a contact area between the first sealing ring 8a and the lower end part 33a of the rotor body 31, a contact area between the first sealing ring 8a and the through-hole 23 of the circular cylindrical chamber 21, a contact area between the second sealing ring 8b and the upper end part 33b of the rotor body 31, and a contact area between the second sealing ring 8b and the through-hole 60 in the lid 6. As a result, seal tightness between the through-hole 23 of the circular cylindrical chamber 21 and the lower end part 33a of the rotor body 31 and that between the through-hole 60 in the lid 6 and the upper end part 33b of the rotor body 31 become stable, thus further decreasing the likelihood of leakage of the viscous fluid filled within the circular cylindrical chamber 21 through the gaps therebetween.

Furthermore, according to the present embodiment, in each of the first and second sealing rings 8a, 8b, the width t6 of the inner peripheral surface 84 is smaller than the width t7 of the outer peripheral surface 85. This results in a friction coefficient of each inner peripheral surface 84 smaller than a friction coefficient of the corresponding outer peripheral surface 85; rotating the rotor 3 relative to the circular cylindrical chamber 21 inside the case 2 causes sliding between each inner peripheral surface 84 with the a smaller frictional resistance and its corresponding counterpart surface (in case of the first sealing ring 8a, the outer peripheral surface 34 of the lower end part 33a of the rotor body 31, but in case of the second sealing ring 8b, the outer peripheral surface 34 of the upper end part 33b of the rotor body 31), meanwhile each outer peripheral surface 85 with a larger frictional resistance remains in close contact with and in no sliding relative to its corresponding counterpart surface (in case of the first sealing ring 8a, the inner peripheral surface 220 of the through-hole 23 of the circular cylindrical chamber 21, but in case of the second sealing ring 8b, the inner peripheral surface 64 of the through-hole 60 in the lid 6).

Furthermore, according to the present embodiment, the circumferential grease grooves 86 are formed in the inner peripheral surfaces 84 of the first and second sealing rings 8a, 8b, and the grease is filled in these grease grooves 86. Therefore, frictional resistance between each of the first and second sealing rings 8a, 8b and the rotor 3 becomes decreased, and this enables the rotor 3 to slide more smoothly.

Furthermore, in the present embodiment, the first and second sealing rings 8a, 8b each have the corresponding inner peripheral annular part 81 rectangular in cross section including the inner peripheral surface 84, the corresponding outer peripheral annular part 82 rectangular in cross section including the outer peripheral surface 85, and the corresponding coupling part 83 providing the connection between the corresponding inner peripheral annular part 81 and the corresponding outer peripheral annular part 82; in addition, the coupling part 83 of each rings 8a, 8b has the width t8 which is smaller in the direction of the center axis 20 of the circular cylindrical chamber 21 than that of both the corresponding inner peripheral annular part 81 and the corresponding outer peripheral annular part 82. Consequently, when each of the first and second sealing rings 8a, 8b is subject to stress, the corresponding coupling part 83 is elastically deformed to absorb the stress, thereby suppressing elastic deformation of the corresponding inner peripheral annular part 81 and that of the corresponding outer peripheral annular part 82 to reduce the changes in the following respective contact areas: the contact area between the first sealing ring 8*a* and the lower end part 33*a* of the rotor body 31, the contact area between the first sealing ring 8*a* and the through-hole 23 of the circular cylindrical chamber 21, the contact area between the second sealing ring 8*b* and the upper end part 33*b* of the rotor body 31, and the contact area between the second sealing ring 8*b* and the through-hole 60 in the lid 6. Consequently, seal tightness between the through-hole 23 of the circular cylindrical chamber 21 and the lower end part 33*a* of the rotor body 31 and that between the through-hole 60 in the lid 6 and the upper end part 33*b* of the rotor body 31 become further stable, thus further decreasing the likelihood of leakage of the viscous fluid filled within the circular cylindrical chamber 21 through the gaps therebetween.

Furthermore, in the present embodiment, the step 221 and the step 222 are formed on the inner peripheral surface 220 of the through-hole 23 of the circular cylindrical chamber inside the case 2 so as to respectively restrict the first sealing ring 8*a* and the first bushing 4*a* from moving axially outward, and the step 340*a* is formed on the outer peripheral surface 34 of the lower end part 33*a* of the rotor body 31 so as to restrict the first sealing ring 8*a* and the first bushing 4*a*, both being attached, from moving axially inward. This restricts axial movement of both the first sealing ring 8*a* and the first bushing 4*a* thereby achieving enhancement in seal tightness provided by the first sealing ring 8*a*, and also stabilizes a position where the first bushing 4*a* holds the rotor 3 thereby achieving more effective reduction of misalignment of the rotor 3.

In a similar way, in the present embodiment, the step 65 and the step 66 are formed on the inner peripheral surface of the through-hole 60 in the lid 6 so as to restrict respectively the second sealing ring 8*b* and the second bushing 4*b* from moving axially outward, and the step 340*b* is formed on the outer peripheral surface 34 of the upper end part 33*b* of the rotor body 31 so as to restrict the second sealing ring 8*b* and the second bushing 4*b* from moving axially inward. This restricts axial movement of both the second sealing ring 8*b* and the second bushing 4*b* thereby achieving enhancement in seal tightness provided by the second sealing ring 8*b*, and also stabilizes a position where the second bushing 4*b* holds the rotor 3 thereby achieving more effective reduction of misalignment of the rotor 3.

Furthermore, according to the present embodiment, because resin excellent in sliding properties, such as polyamide, is used as the material for the valve seals 5, each of the valve seals 5 acts as a slide bearing for slidable support of the outer peripheral surface 34 of the rotor body 31 of the rotor 3, thereby absorbing, along with the first bushing 4*a* and the second bushing 4*b*, rattling due to decentering and others of the shaft for transmitting the external rotation force to the rotor 3, and this causes the shaft to be rotatable smoothly.

The present invention can include, but is not limited to, the above embodiments: it will be obvious to those skilled in the art that various changes may be made without departing from the scope of the invention.

For example, in the above embodiments, the first bushing 4*a* is located axially outside the first sealing ring 8*a* (See FIG. 2(A) and FIG. 4(A)), but not limited in this respect: the first bushing 4*a* may be located axially inside the first sealing ring 8*a*. Similarly, in the above embodiments, the second bushing 4*b* is located axially outside the second sealing ring 8*b* (See FIG. 2(A), FIG. 3(A), and FIG. 3(B)); however, the second bushing 4*b* may be located axially inside the second sealing ring 8*b*. For these cases, the circular cylindrical chamber 21 inside the case 2 holds the viscous fluid excellent in lubricating properties, and therefore the first bushing 4*a* and the second bushing 4*b* are lubricated by the viscous fluid held in the circular cylindrical chamber inside the case 2 to hold the rotor 3 rotatable more smoothly.

The above embodiments use as each of the first and second sealing rings 8*a*, 8*b*, a member having the inner peripheral annular part 81 having a rectangular cross-section and including the inner peripheral surface 84, the outer peripheral annular part 82 having a rectangular cross-section and including the outer peripheral surface 85, and the coupling part 83 providing the connection between the inner peripheral annular part 81 and the outer peripheral annular part 82; however the scope of the present invention is not limited in this respect. Anything may be used as each of the first and second sealing rings 8*a*, 8*b* as long as it has the inner peripheral surface 84 having the width t6 in the direction of the center axis 20 of the circular cylindrical chamber 21 and the outer peripheral surface 85 having the width t7 in the direction of the center axis 20 of the circular cylindrical chamber 21. Examples of each ring 8*a*, 8*b* may include an annular member that is rectangular in cross section and has the inner peripheral surface 84 and the outer peripheral surface 85.

In the above embodiments, each of the first and second sealing rings 8*a*, 8*b* is designed such that the width t6 of the corresponding inner peripheral surface 84 is smaller than the width t7 of the corresponding outer peripheral surface 85, resulting in occurrence of slide between the corresponding inner peripheral surface 84 and its counterpart surface. The scope of the present invention; however, is not limited in this respect. For example, each of the first and second sealing rings 8*a*, 8*b* may be designed such that the width t7 of the corresponding outer peripheral surface 85 is smaller than the width t6 of the corresponding inner peripheral surface 84, thereby enabling the corresponding outer peripheral surface 85 to slide relative to its counterpart surface. Alternatively, each of the first and second sealing rings 8*a*, 8*b* may be designed such that the width t6 of the corresponding inner peripheral surface 84 is about equal to the width t7 of the outer peripheral surface 85, thereby causing the inner peripheral surface 84 and the outer peripheral surface 85 to be slidable relative to the respective counterpart surfaces.

In the above embodiments, the circumferential grease grooves 86 are formed on the inner peripheral surfaces 84 of the first and second sealing rings 8*a*, 8*b*, and the grease is filled in these grease grooves 86. The scope of the present invention, however, is not limited in this respect. As for each of the first and second sealing rings 8*a*, 8*b*, the circumferential grease groove(s) may be formed on at least one surface slidable to its counterpart surface, out of two surfaces that are the inner peripheral surface 84 and the outer peripheral surface 85, and grease may be filled in the grease groove(s).

In the above embodiments, the inner peripheral surface 84 and the outer peripheral surface 85, of each of the first and second sealing rings 8*a*, 8*b*, are flat in the direction of the center axis 20 of the circular cylindrical chamber 21; however, the scope of the present invention is not limited in this respect. Any surface can be available as either the inner peripheral surface 84 or the outer peripheral surface 85, of each of the first and second sealing rings 8*a*, 8*b*, as far as it has a width in the direction of the center axis 20 of the circular cylindrical chamber 21.

FIG. 11(A) is a front view of each of modifications 8'*a*, 8'*b* of the first and second sealing rings 8*a*, 8*b*, FIG. 11(B) is an I-I cross-section view of each modification 8'*a*, 8'*b* as illustrated in FIG. 11(A), and FIG. 11(C) is an enlarged view of the part G of each modification 8'a, 8'b as illustrated in FIG. 11(B).

These modifications 8'a, 8'b are, as with the first and second sealing rings 8a, 8b, annular members made of elastic material, such as nitrile butadiene rubber: the modification 8'a of the first sealing ring 8a has an inner diameter d1 smaller than an outer diameter d4 of the lower end part 33a of the rotor body 31 of the rotor 3 and an outer diameter d2 larger than an inner diameter d3 of the through-hole 23 of the circular cylindrical chamber 21 inside the case 2 (an outer diameter of the step 221); and the modification 8'b of the second sealing ring 8b has an inner diameter d1 smaller than an outer diameter d5 of the upper end part 33b of the rotor body 31 of the rotor 3 and an outer diameter d2 larger than an inner diameter d6 of the through-hole 60 in the lid (an outer diameter of the step). In addition, these modifications 8'a, 8'b each have an inner peripheral surface 84' with the width t6 in the direction of the center axis 80 and an outer peripheral surface 85' with the width t7 in the direction of the center axis 80. Here, the width t6 of the inner peripheral surface 84' and the width t7 of the outer peripheral surface 85' are equal in length, but both may be different in length.

The inner peripheral surface 84' is a curved surface along arc having a radius r1 larger than half of a radial width t10 of the modification 8'a, 8'b in the direction of the center axis 80 coincident with the center axis 20 of the circular cylindrical chamber 21 inside the case 2: for the modification 8'a of the first sealing ring 8a, the inner peripheral surface 84' is pressed against the outer peripheral surface 34 of the lower end part 33a of the rotor body 31 of the rotor 3, whereas for the modification 8'b of the second sealing ring 8b, against the outer peripheral surface 34 of the upper end part 33b of the rotor body 31 of the rotor 3. Similarly, the outer peripheral surface 85' is a curved surface along an arc having a radius r2 larger than half of the radial width t10 of the modification 8'a, 8'b in the direction of the center axis 80; for the modification 8'a of the first sealing ring 8a, the outer peripheral surface 85' is pressed against the inner peripheral surface 220 of the through-hole 23 of the circular cylindrical chamber 21 inside the case 2, whereas for the modification 8'b of the second sealing ring 8b, against the inner peripheral surface 64 of the through-hole 60 in the lid 6.

Also for such the structure, it is possible to lessen a curvature of the inner peripheral surface 84' and that of the outer peripheral surface 85' in comparison with respective curvatures of O-ring usable as alternative for each of the modifications 8'a, 8'b. This enables resultant reduction of changes in contact areas between both the inner peripheral surface 84' and the outer peripheral surface 85' and the respective counterpart surfaces upon deforming the modifications 8'a, 8'b elastically in the radial direction, thereby achieving enhancement in seal tightness.

The above embodiments have been described taking the example in which the circular cylindrical chamber 21 is provided with the pair of the partitioning parts 25 and the rotor 3 is provided with the pair of the vanes 32. The scope of the present invention, however, is not limited in this respect. As far as the partitioning part(s) 25 formed in the circular cylindrical chamber 21 and the vane(s) 32 formed on the rotor 3 are the same in number, the numbers of the partitioning part(s) 25 and the vane(s) 32 each may be one, three, or more.

In the above embodiments, the valve seal 5 attached to each vane 32 serves as a check valve for opening and closing the flow passage 36 formed through the corresponding vane 32, but the scope of the present invention is not limited in this respect. In addition to the valve seals 5, check valves may be used which close the flow passages 36 formed in the respective vanes 32 on rotating the rotor 3 in the first rotating direction R1 relative to the circular cylindrical chamber 21 and which open the flow passages 36 formed in the respective vanes 32 on rotating the rotor 3 in the second rotating direction R2 relative to the circular cylindrical chamber 21.

In the above embodiments, the flow passages 36 are each formed in the corresponding vane 32 along the rotation direction of the rotor 3 so as to pass through the both side faces 37a, 37b of the corresponding vane 32, but the scope of the present invention is not limited in this respect. In the partitioning parts 25 instead of the vanes 32 or not only in the vanes 32 but also in the partitioning parts 25, such flow passages may be formed along the rotation direction of the rotor 3. In this case, check valves may be installed which close the respective flow passages formed in the partitioning parts 25 upon rotating the rotor 3 in the first rotating direction R1 relative to the circular cylindrical chamber 21 and open the respective flow passages formed in the partitioning parts 25 upon rotating the rotor in the second rotating direction R2 relative to the circular cylindrical chamber 21.

It is noted that when the flow passages are formed in the partitioning part 25, the partitioning parts 25 may each have a seal member attached thereto to serve similarly to the valve seal 5, that is, a seal member including a bottom part having a width longer than a circumferential directional width of an inner peripheral edge of the corresponding partitioning part 25, a first branch formed integrally with one edge of the bottom part and having a width longer than a radial directional width of the flow passage formed through the corresponding partitioning part 25, and a second branch formed integrally with another edge of the bottom part and having a width shorter than a radial directional width of the flow passage formed in the corresponding partitioning part 25. Rotating rotor 3 in the first rotating direction R1 relative to the circular cylindrical chamber 21 causes each of the seal members to bring the first branch into contact with one side of the corresponding partitioning part 25, thereby closing the flow passage formed in each of the partitioning parts 25, and conversely rotating the rotor 3 in the second rotating direction R2 relative to the circular cylindrical chamber 21 causes each of the seal member to move the first branch away from one side of the corresponding partitioning part 25 and to bring the second branch into contact with another side of the corresponding partitioning part 25, thereby opening the flow passage formed in each of the partitioning parts 25.

If the flow passage 36 is not formed in the vane 32, the corresponding valve seal 5 may have any shape as long as it can close the gap between the front face 35 of the vane 32 and the inner peripheral surface 24 of the circular cylindrical chamber 21. Alternatively, the valve seal 5 may be omitted.

In the above embodiments, the internal threaded section 27 is formed on the opening side 28 of the inner peripheral surface 24 of the circular cylindrical chamber 21, the external threaded section 62 is formed on the outer peripheral surface 61 of the lid 6 so as to be screwed into this internal threaded section 27, and the lid 6 is thereby fixed to the case 2. The scope of the present invention, however, is not limited in this respect. The lid 6 may be fixed to the case 2, for example, by bolts or by rivets. Alternatively, the lid 6 and the case 2 may be joined by joining way, such as gluing or welding.

In the above embodiments, the external rotation force is applied to the rotor 3, thus rotating the rotor 3 relative to the circular cylindrical chamber 21 inside the case 2. The scope of the present invention, however, is not limited in this respect. Applying the external rotation force to the case 2 may rotate the rotor 3 relative to the circular cylindrical chamber 21 inside the case 2.

The above embodiments have been described taking the example of the so-called uni-directional rotary damper 1 in which rotating the rotor 3 in the first rotating direction R1 relative to the circular cylindrical chamber 21 causes a higher damping torque than if rotating the rotor 3 in the second rotating direction R2 relative to the circular cylindrical chamber 21. The scope of the present invention, however, is not limited in this respect. The present invention may be applied to any so-called bi-directional rotary damper that can work in both the first rotating direction R1 and the second rotating direction R2 so as to cause a damping torque depending on the resistance to motion of the viscous fluid passing through the flow passage formed in each of the vanes 32 or in each of the partitioning parts (the degree to which the viscous fluid is hard to be moved through the flow passage). For this case, the valve seal 5 may not necessarily need to serve as a check valve. The valve seal 5 may be anything as long as it can fill the gap between the front face 35 of the corresponding vane 32 and the inner peripheral surface 24 of the circular cylindrical chamber 21. Alternatively, the valve seal 5 may be omitted.

The above embodiment has been described taking the example of the rotary damper 1 that generates the damping torque in reaction to the external rotation force by limiting movement of the viscous fluid. The present invention can include, but is not limited to, the above embodiment. The present invention can be widely applied to any damper that generates a damping force in reaction to an external force by limiting a movement of viscous fluid.

FIG. 12(A) is a side view of a linear type damper 9 according to another embodiment of the present invention, and FIG. 12(B) is a J-J cross-section view of the linear type damper as illustrated in FIG. 12(A).

The linear type damper 9 according to the present embodiment is available for any device in which a linear motion of a moving object is to be damped, such as seats with height adjustment function and movable shelves. As illustrated in the figures, the linear type damper 9 has the following: a case 920 and a lid 960 that form the fluid holding chamber holding the viscous fluid (not illustrated in the figures), such as oil or silicone; and a shaft 930 housed in the fluid holding chamber so as to be linearly movable relative to the fluid holding chamber in a direction of a center axis 902.

A circular cylindrical chamber 921 with one end open (i.e. a space having a circular cylindrical shape with a bottom) is formed inside of the case 920, and an insertion hole 923 for insertion of the shaft 930 is formed in a bottom part 922 of this circular cylindrical chamber 921. A first sealing ring 980*a* and a first bushing 990*a* are attached to this insertion hole 923, and then the insertion of one end part 933*a* of a below-mentioned shaft body 931 into the insertion hole 923 having these first sealing ring 980*a* and first bushing 990*a* attached thereto places the shaft 930 in the circular cylindrical chamber 921 so as to align a center axis 903 of the shaft 930 with the center axis 902 of the circular cylindrical chamber 921.

A mounting section 927 for attachment of the first sealing ring 980*a* and the first bushing 990*a* is formed in an inner peripheral surface 929 of the insertion hole 923 to be in a stepped annular groove shape. A through-hole 926 for air vent is formed through a bottom part 925 inside the insertion hole 923. The lid 960 is fixed onto the opening side 928 of an inner peripheral surface 924 of the circular cylindrical chamber 921 by jointing way, such as threaded joint, gluing, welding, fastening with a screw, and fastening with a machine screw.

The shaft 930 includes the shaft body 931 in a substantial cylindrical shape and a flange 932 formed near or at the middle of length of the shaft body 931.

The flange 932 projects, near or at the middle of length of the shaft body 931, radially outward from an outer peripheral surface 934 of the shaft body 931 so as to place its outer peripheral surface 935 close to the inner peripheral surface 924 of the circular cylindrical chamber 921 inside the case 920, thereby partitioning the inside of the circular cylindrical chamber 921. The flange 932 forms volume changing means to compress one area and expand another area within the circular cylindrical chamber 921 partitioned by the flange 932 according to linear motion in a direction along the center axis 903 of the shaft 930. In the flange 932, flow passages 936 are formed along the direction of the center axis 903 of the shaft 930 so as to pass through both side face 937*a*, 937*b* of the flange 932. Check valves 970 are installed in the respective flow passages 936 so as to close the respective flow passages 936 in case of moving the shaft 930, along the center axis 902 of the circular cylindrical chamber 921, in a first moving direction L1, and so as to open the respective flow passages 936 in another case of moving the shaft 930 in a second moving direction L2, namely, a direction opposite to the first moving direction L1. A gap g' is formed between the outer peripheral surface 935 of the flange 932 and the inner peripheral surface 924 of the circular cylindrical chamber 921 inside the case 920 so as to work as a flow passage for the viscous fluid filled within the circular cylindrical chamber 921.

The shaft body 931 serves as a resistance generating member capable of moving in the direction of the center axis 902 of the circular cylindrical chamber 921 relative to the circular cylindrical chamber 921 in reaction to the external force in the direction of the center axis 903 of the shaft 930. For the shaft body 931, one end part 933*a* is to be inserted into the insertion hole 923 formed in the bottom part 922 of the circular cylindrical chamber 921 inside the case 920 so as to be movable in the direction of the center axis 902 of the circular cylindrical chamber 921, whereas another end part 933*b* is to be inserted into a through-hole 961 in the lid 960 so as to be movable in the direction of the center axis 902 of the circular cylindrical chamber 921.

In the lid 960, the through-hole 961 for insertion of the shaft 930, which serves as the opening section of the fluid holding chamber, is formed at a place opposite to the insertion hole 923 formed in the bottom part 922 of the circular cylindrical chamber 921 inside the case 920. A second sealing ring 980*b* and a second bushing 990*b* are attached to this through-hole 961, another end part 933*b* of the shaft body 931 of the shaft 930 is inserted into the through-hole 961 to which these second sealing ring 980*b* and second bushing 990*b* are attached. Moreover, a mounting section 962 for attachment of the second sealing ring 980*b* and the second bushing 990*b* is formed in an inner peripheral surface 964 of the through-hole 961 to be in a stepped annular groove shape.

The first bushing 990*a* and the second bushing 990*b* are each a cylindrical member made of material excellent in sliding properties: the first bushing 990*a* has an inner peripheral surface slidable to the outer peripheral surface 934 of the shaft body 931 of the shaft 930 and an outer peripheral surface to abut the inner peripheral surface 929 of the insertion hole 923 of the circular cylindrical chamber

921 inside the case 920; and the second bushing 990b has an inner peripheral surface slidable to the outer peripheral surface 934 of the shaft body 931 of the shaft 930 and an outer peripheral surface to abut the inner peripheral surface 964 of the through-hole 961 in the lid 960.

The first bushing 990a and the second bushing 990b may each be made of metal, such as brass alloy, or synthetic resin, such as PTFE, polyacetal resin, polyethylene resin, polyamide resin, and polyphenylene sulfide resin. Alternatively, the first bushing 990a and the second bushing 990b may each be made of such multi-layer sliding material that on an inner peripheral surface of a backing material in a cylindrical shape are formed a plurality of sliding layers each including a woven or a non-woven fabric impregnated with synthetic resin, such as phenolic resin.

Figure 10:
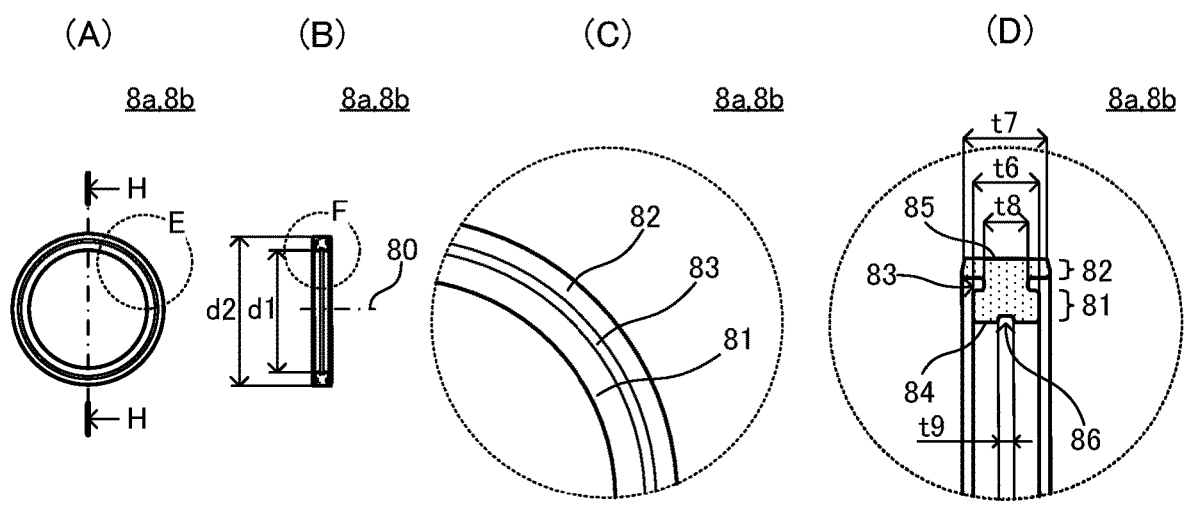
FIG. 10(A) is a front view of each of the first and second sealing rings 8a, 8b.
FIG. 10(B) is an H-H cross-section view of each of the first and second sealing rings 8a, 8b as illustrated in FIG. 10(A)
FIG. 10(C) is an enlarged view of the part E of each of the first and second sealing rings 8a, 8b as illustrated in FIG. 10(A)
FIG. 10(D) is an enlarged view of the part F of each of the first and second sealing rings 8a, 8b as illustrated in FIG. 10(B).
Figure 11:
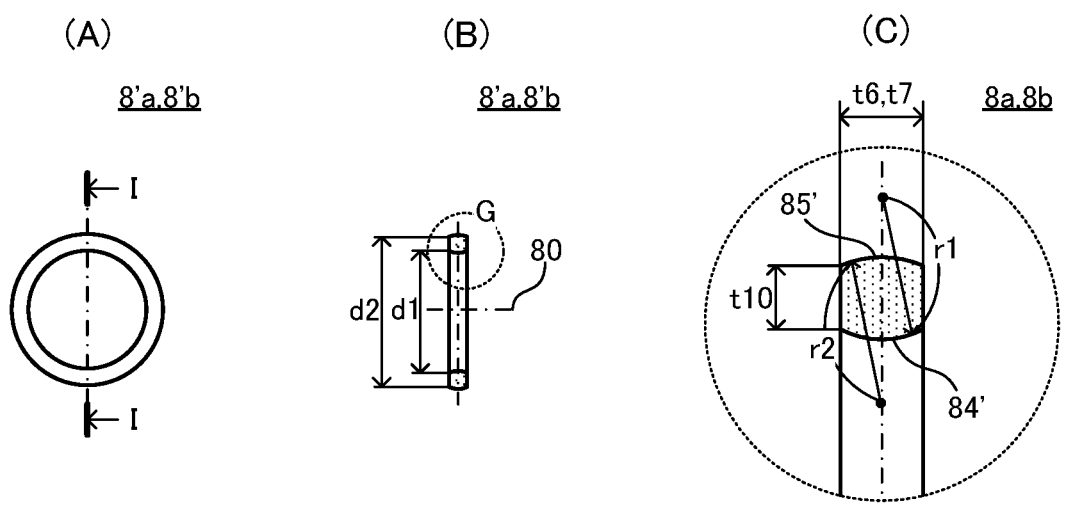
FIG. 11(A) is a front view of each of modifications 8'a, 8'b of the first and second sealing rings 8a, 8b.
FIG. 11(B) is an I-I cross-section view of each modification 8'a, 8'b as illustrated in FIG. 11(A)
FIG. 11(C) is an enlarged view of the part G of each modification 8'a, 8'b as illustrated in FIG. 11(B).

The first and second sealing rings 980a, 980b are each an annular member made of elastic material, such as nitrile butadiene rubber. The first sealing ring 980a includes an inner peripheral surface having a width in the direction of the center axis 902 of the circular cylindrical chamber 921 and being slidably pressed against the outer peripheral surface 934 of the shaft body 931 and an outer peripheral surface having a width in the direction of the center axis 902 of the circular cylindrical chamber 921 and being pressed against a groove bottom inside the mounting section 927 formed in the inner peripheral surface 929 of the insertion hole 923 of the case 920. The second sealing ring 980b includes an inner peripheral surface having a width in the direction of the center axis 902 of the circular cylindrical chamber 921 and being slidably pressed against the outer peripheral surface 934 of the shaft body 931 and an outer peripheral surface having a width in the direction of the center axis 902 of the circular cylindrical chamber 921 and being pressed against a groove bottom inside the mounting section 962 formed in the inner peripheral surface 964 of the through-hole 961 in the lid 960. Here, the first and second sealing rings 980a, 980b may respectively be the first and second sealing rings 8a, 8b as illustrated in FIG. 10 or be the modifications 8'a, 8'b of the first and second sealing rings 8a, 8b as illustrated in FIG. 11, for example.

For the linear type damper 9 with the structure as described above, when the external force on the shaft 930 or on the case 920 moves the shaft 930 linearly in the first moving direction L1 relative to the circular cylindrical chamber 921 inside the case 920, the check valves 970 close the respective flow passages 936. Consequently, movement of the viscous fluid filled within the circular cylindrical chamber 921 is only allowed through the gap g' between the outer peripheral surface 935 of the flange 932 of the shaft 930 and the inner peripheral surface 924 of the circular cylindrical chamber 921, thereby increasing pressure on the viscous fluid within an area 921a located in the first moving direction L1 relative to the flange 932. Therefore, a high damping torque generates.

To the contrary, when the external force on the shaft 930 or the case 920 moves the shaft 930 linearly in the second moving direction L2 relative to the circular cylindrical chamber 921 inside the case 920, the check valves 970 open the respective flow passages 936. Consequently, the viscous fluid filled within the circular cylindrical chamber 921 moves not only through the gap g' between the outer peripheral surface 935 of the flange 932 and the inner peripheral surface 924 of the circular cylindrical chamber 921 but also through the flow passages 936 formed in the flange 932, and therefore pressure on the viscous fluid within an area 921b located in the second moving direction L2 relative to the flange 932 does not become increased as compared to that of the case of moving the shaft 930 in the first moving direction L1 relative to the circular cylindrical chamber 921 inside the case 920. This results in generation of a lower damping torque than that of the case of rotating the shaft 930 in the first moving direction L1 relative to the circular cylindrical chamber 921 inside the case 920.

The linear type damper 9 with the structure as described above also achieves an advantage similar to that of the rotary damper 1 as illustrated in FIG. 1. Namely, for the linear type damper 9, the shaft 930 is slidably held by both the first bushing 990a and the second bushing 990b respectively attached to the insertion hole 923 of the circular cylindrical chamber 921 inside the case 920 and the through-hole 961 in the lid 960, and therefore the misalignment of the shaft 930 is suppressed even without enhancement of the stiffness of the first sealing ring 980a and the second sealing ring 980b which along with the first bushing 990a and the second bushing 990b hold the shaft 930 slidable. This enables the first sealing ring 980a and the second sealing ring 980b to be each designed to have such low stiffness that the both rings 980a, 980b can be elastically deformed depending on movement of the shaft 930, thereby resulting in no gap between the shaft 930 and both the first sealing ring 980a and the second sealing ring 980b and in resultant decrease of the likelihood of external leakage of the viscous fluid held within the circular cylindrical chamber 921 inside the case 920.

Moreover, in the linear type damper 9, the first sealing ring 980a is located between the insertion hole 923 of the circular cylindrical chamber 921 inside the case 920 and one end part 933a of the shaft body 931 of the shaft 930, and the second sealing ring 980b is located between the through-hole 961 in the lid 960 and another end part 933b of the shaft body 931: the first sealing ring 980a includes an inner peripheral surface having the width in the direction of the center axis 902 of the circular cylindrical chamber 921 and being slidably pressed against the outer peripheral surface 934 of the shaft body 931 and an outer peripheral surface having the width in the direction of the center axis 902 of the circular cylindrical chamber 921 and being pressed against the groove bottom inside the mounting section 927 formed in the inner peripheral surface 929 of the insertion hole 923 of the case 920, and the second sealing ring 980b includes an inner peripheral surface having the width in the direction of the center axis 902 of the circular cylindrical chamber 921 and being slidably pressed against the outer peripheral surface 934 of the shaft body 931 and an outer peripheral surface having the width in the direction of the center axis 902 of the circular cylindrical chamber 921 and being pressed against the groove bottom inside the mounting section 962 formed in the inner peripheral surface 964 of the through-hole 961 in the lid 960.

This enables resultant reduction of the changes in the following contact areas upon occurrence of misalignment of the shaft 930 causing elastic deformation of each of the first and second sealing rings 980a, 980b in the radial direction, in comparison with the case of using an O-ring with a circular cross-section as an alternative to each of the first and second sealing rings 980a, 980b: a contact area between the first sealing ring 980a and one end part 933a of the shaft body 931, a contact area between the first sealing ring 980a and the groove bottom inside the mounting section 927 formed in the insertion hole 923 of the circular cylindrical chamber 921, a contact area between the second sealing ring 980b and another end part 933b of the shaft body 931, and a contact area between the second sealing ring 980b and the groove bottom inside the mounting section 962 formed in the through-hole 961 in the lid 960. As a result, seal tightness between the insertion hole 923 of the circular cylindrical chamber 921 and one end part 933a of the shaft body 931 and that between the through-hole 961 in the lid 960 and another end part 933b of the shaft body 931 become stable, thus decreasing the likelihood of leakage of the viscous fluid filled within the circular cylindrical chamber 921 through the gaps therebetween.

REFERENCE SIGNS LIST

1: rotary damper; 2,920: case; 3: rotor; 4a,990a: first bushing; 4b,990b: second bushing; 5: valve seal; 6,960: lid; 7: O-ring; 8a,980a: first sealing ring; 8b,980b: second sealing ring; 9: linear type damper; 21,921: circular cylindrical chamber; 22: bottom part of the circular cylindrical chamber 21; 23: through-hole of the circular cylindrical chamber 21; 24: inner peripheral surface of the circular cylindrical chamber 21; 25: partitioning part; 26: front face of the partitioning part 25; 27: internal threaded section; 28: opening side of the circular cylindrical chamber 21; 29: upper face of the partitioning part 25; 31: rotor body; 32: vane; 33a: lower end part of the rotor body 31; 33b: upper end part of the rotor body 31; 34: outer peripheral surface of the rotor body 31; 35: front face of the vane 32; 36,936: flow passage; 37a,37b: both side faces of the vane 32; 38: insertion hole of the rotor body 31; 39: upper face of the vane 32; 40a: inner peripheral surface of the first bushing 4a; 40b: inner peripheral surface of the second bushing 4b; 41a: outer peripheral surface of the first bushing 4a; 41b: outer peripheral surface of the second bushing 4b; 50: bottom part of the valve seal 5; 51,52: edge of the bottom part 50 of the valve seal 5; 53: first branch of the valve seal 5; 54: second branch of the valve seal 5; 60: through-hole in the lid 6; 61: outer peripheral surface of the lid 6; 62: external threaded section; 63: lower face of the lid 6; 64: inner peripheral surface of the through-hole 60; 65,66: step of the inner peripheral surface 64; 67: groove of the lid 6; 81: inner peripheral annular part; 82: outer peripheral annular part; 83: coupling part; 84: inner peripheral surface of the inner peripheral annular part 81; 85: outer peripheral surface of the outer peripheral annular part 82; 86: grease groove; 220: inner peripheral surface of the through-hole 23; 221,222: step on the inner peripheral surface 220; 340a: step of the outer peripheral surface 34 of the lower end part 33a; 340b: step on the outer peripheral surface 34 of the upper end part 33b; 922: bottom part of the circular cylindrical chamber 921; 923: insertion hole; 924: inner peripheral surface of the circular cylindrical chamber 921; 925: bottom part inside the insertion hole 923; 926: through-hole for air vent; 927: mounting section for the first sealing ring 980a; 928: opening side of the circular cylindrical chamber 921; 929: inner peripheral surface of the insertion hole 923; 930: shaft; 931: shaft body; 932: flange; 933a, 933b: both end parts of the shaft body 931; 934: outer peripheral surface of the shaft body 931; 935: outer peripheral surface of the flange 932; 937a,937b: both side faces of the flange 932; 961: through-hole in the lid 960; 962: mounting section for the second sealing ring 980b; 964: inner peripheral surface of the through-hole 961; 970: check valve

The invention claimed is:

1. A damper for generating a damping force in reaction to an external force by limiting a movement of a viscous fluid, the damper comprising:
a fluid holding chamber including an opening section and holding the viscous fluid;
a resistance generating member inserted in the opening section of the fluid holding chamber and movable relative to the fluid holding chamber in reaction to the external force;
volume changing means partitioning an inside of the fluid holding chamber and configured to compress one of areas within the fluid holding chamber partitioned and to expand another of the areas, with a movement of the resistance generating member relative to the fluid holding chamber;
a flow passage connecting between the areas within the fluid holding chamber partitioned by the volume changing means;
a bushing attached to the opening section of the fluid holding chamber and holding slidable the resistance generating member inserted in the opening section of the fluid holding chamber; and
an elastic member in a substantial annular shape, located between the resistance generating member held by the bushing and the opening section of the fluid holding chamber,
the elastic member comprising:
an inner peripheral annular part having a rectangular cross-section and including an inner peripheral surface, the inner peripheral surface having a width in a direction of a center axis of the fluid holding chamber and being pressed against the resistance generating chamber;
an outer peripheral annular part having a rectangular cross section and including an outer peripheral surface of the elastic member, the outer peripheral surface having a width in the direction of the center axis of the fluid holding chamber and being pressed against the fluid holding chamber; and
a coupling part connecting the inner peripheral annular part and the outer peripheral annular part,
the coupling part having a width, in the direction of the center axis of the fluid holding chamber, smaller than a width of the inner peripheral annular part and than a width of the outer peripheral annular part.

2. A damper according to claim 1, wherein the bushing is located outside the elastic member with respect to relation to the fluid holding chamber, in an axial direction of the damper.

3. A damper according to claim 1, wherein the inner peripheral surface and/or the outer peripheral surface of the elastic member is flat in the direction of the center axis of the fluid holding chamber.

4. A damper according to claim 1, wherein the inner peripheral surface and/or the outer peripheral surface of the elastic member includes a curved surface along an arc having a radius larger than half of a radial width of the elastic member in the direction of the center axis of the fluid holding chamber.

5. A damper according to claim 1, wherein a width of one of the inner and outer peripheral surfaces of the elastic member, in the direction of the center axis of the fluid holding chamber, is smaller than a width of another of the inner and outer peripheral surfaces of the elastic member, in the direction of the center axis of the fluid holding chamber.

6. A damper according to claim 5, having a range represented by $(a2/a1) \leq 3$, where a1 representing the width of the inner peripheral surface of the elastic member in the direction of the center axis of the fluid holding chamber, and a2 representing the width of the outer peripheral surface of the elastic member in the direction of the center axis of the fluid holding chamber.

7. A damper according to claim 1, having a range represented by (a2/a1)≤3, where a1 representing the width of the inner peripheral surface of the elastic member in the direction of the center axis of the fluid holding chamber, and a2 representing the width of the outer peripheral surface of the elastic member in the direction of the center axis of the fluid holding chamber.

8. A damper according to claim 1,
wherein the elastic member includes at least one circumferential groove formed in at least one of the inner and outer peripheral surfaces of the elastic member.

9. A damper according to claim 8, having a range represented by 0.05≤b1/b2≤0.5, where b1 representing a combined width of the at least one circumferential groove in the direction of the center axis of the fluid holding chamber, and b2 representing a width in the direction of the center axis of the fluid holding chamber, of the inner or outer peripheral surface of the elastic member in which the at least one circumferential groove is formed.

10. A damper according to claim 1, having ranges of c3<c1<c2 and 0.3≤c3/c1≤0.95, where c1 representing the width of the inner peripheral annular part in the direction of the center axis of the fluid holding chamber, c2 representing the width of the outer peripheral annular part in the direction of the center axis of the fluid holding chamber, and c3 representing the width of the coupling part in the direction of the center axis of the fluid holding chamber.

11. A damper according to claim 1,
wherein the resistance generating member has a step formed on an outer peripheral surface facing the opening section of the fluid holding chamber and configured to restrict the elastic member and the bushing from moving inward in an axial direction.

12. A damper according to claim 1,
wherein the opening section of the fluid holding chamber has a step formed on an inner peripheral surface facing the resistance generating member and configured to restrict the elastic member from moving axially outward.

13. A damper according to claim 1,
wherein the opening section of the fluid holding chamber has a step formed on an inner peripheral surface facing the resistance generating member and configured to restrict the bushing from moving axially outward.

14. A damper according to claim 1, further comprising a check valve, the check valve configured to close the flow passage upon occurrence of rotational motion of the resistance generating member in a first rotating direction relative to the fluid holding chamber, and to open the flow passage upon occurrence of rotational motion of the resistance generating member relative to the fluid holding chamber in a second rotating direction opposite to the first rotating direction.

15. A damper according to claim 1,
wherein the fluid holding chamber comprises:
a case in a substantial cylindrical shape having one end opened; and
a lid fitted to an opening side end of the case and held the viscous fluid within the case; and
the opening section of the fluid holding chamber is formed on at least one of another end of the case or the lid.

16. A damper according to claim 1, wherein:
the resistance generating member includes a rotor body inserted in the fluid holding chamber and housed in the fluid holding chamber so as to be rotatable relative to the fluid holding chamber in reaction to a rotation force given as the external force;
the volume changing means comprises:
a partitioning part being along the center axis of the fluid holding chamber and projecting radially inward from an inner peripheral surface of the fluid holding chamber to partition the inside of the fluid holding chamber; and
a vane being along the center axis of the fluid holding chamber and projecting radially outward from an outer peripheral surface of the rotor body to place a front face close to the inner peripheral surface of the fluid holding chamber and to partition the inside of the fluid holding chamber.

17. A damper according to claim 16,
wherein the flow passage is formed in the partitioning part or in the vane of the volume changing means and connects between the areas within the fluid holding chamber partitioned by the partitioning part or by the vane.

* * * * *